(12) United States Patent
Hagelqvist

(10) Patent No.: US 9,821,527 B2
(45) Date of Patent: Nov. 21, 2017

(54) APPARATUS AND METHOD FOR MANUFACTURING OF CONTAINERS

(75) Inventor: Per Hagelqvist, Lund (SE)

(73) Assignee: A&R CARTON LUND AB, Lund (SE)

( * ) Notice: Subject to any disclaimer, the term of this patent is extended or adjusted under 35 U.S.C. 154(b) by 967 days.

(21) Appl. No.: 14/232,173

(22) PCT Filed: Jul. 11, 2011

(86) PCT No.: PCT/SE2011/050940
§ 371 (c)(1),
(2), (4) Date: Apr. 3, 2014

(87) PCT Pub. No.: WO2013/009227
PCT Pub. Date: Jan. 17, 2013

(65) Prior Publication Data
US 2014/0287901 A1 Sep. 25, 2014

(51) Int. Cl.
*B31B 17/74* (2006.01)
*B29C 65/00* (2006.01)
(Continued)

(52) U.S. Cl.
CPC .......... *B31B 17/74* (2013.01); *B29C 65/3656* (2013.01); *B29C 65/3684* (2013.01);
(Continued)

(58) Field of Classification Search
CPC .......... B65B 43/08; B65B 43/10; B65B 7/28; B65B 7/2842; B65B 7/2878; B65B 35/36;
(Continued)

(56) References Cited

U.S. PATENT DOCUMENTS 3,491,510 A * 1/1970 Sternau .................. B29C 65/10
53/297
3,529,708 A * 9/1970 Dybala .................. B65B 35/36
198/433
(Continued)

FOREIGN PATENT DOCUMENTS

DE 19707007 A1 8/1998
EP 74343 A2 3/1983
(Continued)

OTHER PUBLICATIONS

International Search Report for PCT:SE2011:050940, dated Apr. 4, 2012.
(Continued)

*Primary Examiner* — Thanh Truong
*Assistant Examiner* — Dariush Seif
(74) *Attorney, Agent, or Firm* — Brinks Gilson & Lione

(57) ABSTRACT

The invention concerns an apparatus for manufacturing of containers from blanks of a cardboard based material, said apparatus comprising: a container body forming unit configured to form a cylindrical container body from a substantially plane blank of a multilayer material comprising at least a supporting cardboard layer and a weldable layer; a welding unit configured to fasten an end closure to the container body, said welding unit comprising an inductive welding energy generator for melting of the weldable layer; and transporting means configured to transport a flow of body blanks to the container body forming unit, to transport a flow of container bodies from the container body forming unit to the welding unit, and to transport a flow of container bodies provided with end closures from the welding unit. The invention is characterized in that the transporting means comprises: a first movable gripping arrangement configured to grip at least two container bodies and move these container bodies simultaneously to the welding unit; and a
(Continued)

transferring and positioning arrangement configured to transfer container bodies from the container body forming unit to the first movable gripping arrangement and to position the container bodies in a controlled manner to ensure that the first movable gripping arrangement can grip the at least two container bodies properly, wherein the welding unit is configured to simultaneously fasten an end closure to each of the at least two container bodies. The invention also concerns a method for operating an apparatus of the above type.

19 Claims, 24 Drawing Sheets

(51) Int. Cl.
| | |
|---|---|
| B29C 65/36 | (2006.01) |
| B29C 65/78 | (2006.01) |
| B65B 51/22 | (2006.01) |
| B65B 43/18 | (2006.01) |
| B65B 43/26 | (2006.01) |
| B65B 7/28 | (2006.01) |
| B29L 31/00 | (2006.01) |

(52) U.S. Cl.
CPC ...... *B29C 65/7847* (2013.01); *B29C 65/7864* (2013.01); *B29C 65/7867* (2013.01); *B29C 66/1122* (2013.01); *B29C 66/4322* (2013.01); *B29C 66/49* (2013.01); *B29C 66/53462* (2013.01); *B29C 66/612* (2013.01); *B29C 66/72328* (2013.01); *B29C 66/8322* (2013.01); *B29C 66/849* (2013.01); *B29C 66/8432* (2013.01); *B65B 7/2892* (2013.01); *B65B 43/185* (2013.01); *B65B 43/265* (2013.01); *B65B 51/227* (2013.01); *B29C 66/5432* (2013.01); *B29L 2031/7162* (2013.01); *B31B 2201/0241* (2013.01); *B31B 2201/0258* (2013.01); *B31B 2201/0264* (2013.01); *B31B 2201/0294* (2013.01); *B31B 2201/22* (2013.01); *B31B 2201/2604* (2013.01); *B31B 2201/6026* (2013.01); *B31B 2201/922* (2013.01); *B31B 2201/94* (2013.01); *B31B 2217/064* (2013.01); *B31B 2217/082* (2013.01)

(58) Field of Classification Search
CPC ..... B65B 35/44; B65B 51/227; B65B 7/2807; B65G 25/04; B65G 33/06; B65G 47/31; B65G 2201/0235; B65G 2811/0631; B31B 17/74
USPC ...... 53/558, 563, 564, 289, 299, 329, 329.2, 53/478, 310–312; 493/108, 126
See application file for complete search history.

(56) References Cited

U.S. PATENT DOCUMENTS

| | | | | |
|---|---|---|---|---|
| 3,720,038 A * | 3/1973 | Bryan, Jr. | ............... | B65B 7/164 53/329.3 |
| 4,194,440 A * | 3/1980 | Gorig | ........................ | B31B 1/00 493/105 |
| 4,230,923 A | 10/1980 | Jeppsson | | |
| 4,378,080 A * | 3/1983 | Jennings | ............... | B05B 1/3026 222/380 |
| 5,108,356 A * | 4/1992 | Rickenbach | ........... | B21D 51/46 413/63 |
| 5,117,613 A * | 6/1992 | Pfaffmann | .......... | B29C 65/3656 156/69 |
| 5,200,587 A * | 4/1993 | Fang | .................... | B29C 65/3656 156/274.2 |
| 5,324,249 A * | 6/1994 | Konzal | ..................... | B31B 1/00 493/106 |
| 6,079,185 A * | 6/2000 | Palaniappan | ....... | B29C 65/3656 493/212 |
| 6,199,347 B1 * | 3/2001 | Muller | .................... | B65B 7/164 53/167 |
| 6,251,203 B1 | 6/2001 | Vala et al. | | |
| 6,413,350 B1 * | 7/2002 | Boschi | .................. | B65B 61/184 156/272.2 |
| 7,129,450 B2 * | 10/2006 | Andersson | .......... | B29C 66/4322 156/272.4 |
| 7,348,525 B2 * | 3/2008 | Kupfer | ................ | B29C 65/3656 219/633 |
| 7,389,623 B2 * | 6/2008 | Yano | ........................ | B26D 7/20 493/209 |
| 9,546,009 B2 * | 1/2017 | Hagelqvist | .............. | B65B 31/02 |
| 2004/0007329 A1 * | 1/2004 | Gill | ........................ | B26D 7/10 156/517 |
| 2005/0284102 A1 * | 12/2005 | Herzog | ............... | B29C 65/3656 53/75 |
| 2008/0072536 A1 * | 3/2008 | Chesters | ................ | B65B 7/285 53/285 |
| 2009/0025871 A1 * | 1/2009 | Ash | ........................ | B29B 13/02 156/275.1 |
| 2009/0266034 A1 * | 10/2009 | Rosberg | .................... | B65B 9/20 53/452 |
| 2011/0072764 A1 * | 3/2011 | Daniek | ................ | B26D 7/2614 53/556 |

FOREIGN PATENT DOCUMENTS

| | | |
|---|---|---|
| EP | 0680880 A1 | 11/1995 |
| EP | 1260469 A1 | 11/2002 |
| GB | 1601617 A | 11/1981 |
| GB | 2100696 A | 1/1983 |
| JP | S5655244 A | 5/1981 |
| JP | 2009078815 A | 4/2009 |
| WO | 8404507 A1 | 11/1984 |

OTHER PUBLICATIONS

Written Opinion for PCT:SE2011:050940, dated Apr. 4, 2012.

Office Action for Japanese Application No. 2014-520162, dated Feb. 16, 2015.

Extended European Search Report for PCT/SE2011/050940, dated Jun. 23, 2015.

* cited by examiner

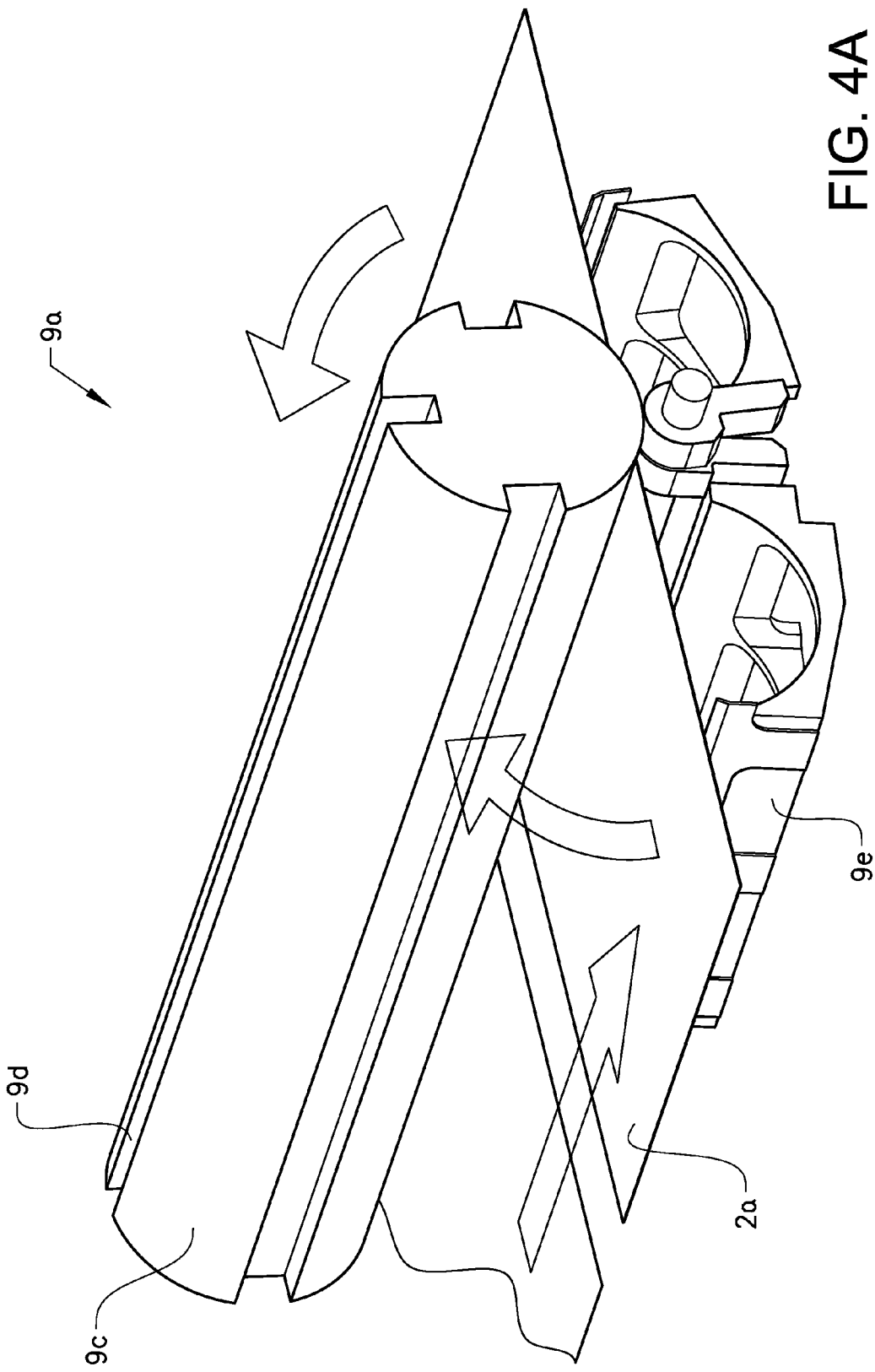

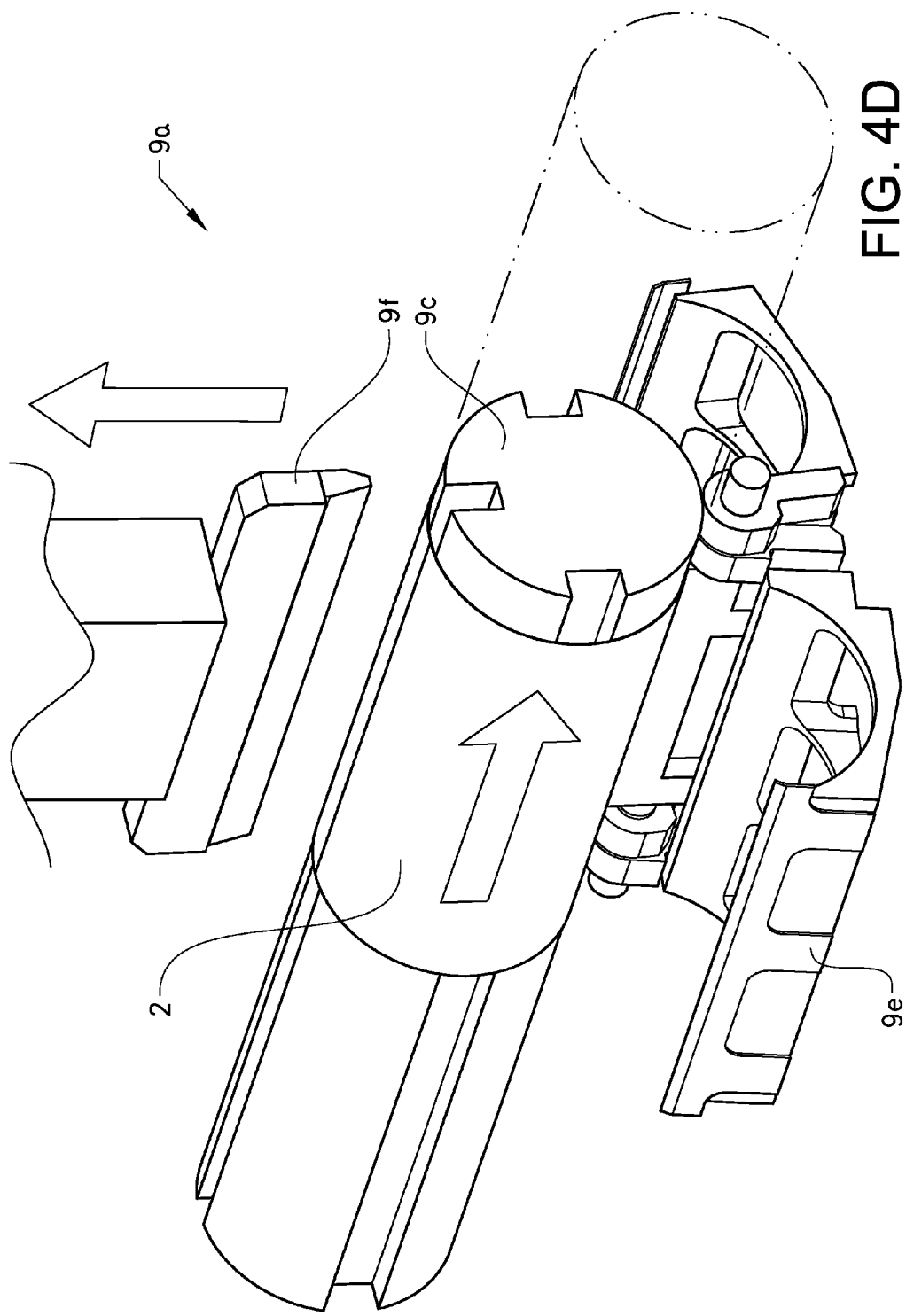

APPARATUS AND METHOD FOR MANUFACTURING OF CONTAINERS

RELATED APPLICATIONS

This application claims the benefit under 35 U.S.C. §371 of International Patent Application No. PCT/SE2011/050940, having an international filing date of Jul. 11, 2011, the contents of which are incorporated herein by reference in its entirety.

TECHNICAL FIELD

This invention relates to an apparatus and method for manufacturing of containers from blanks of a cardboard based material. In particular, the invention relates to an apparatus and method where an end closure is fastened to a container body by inductive heating for melting of a weldable layer that forms part of the container body and/or the end closure.

BACKGROUND OF THE INVENTION

Equipment for manufacturing of containers from blanks of a cardboard based material is described in e.g. EP0074343. Such equipment normally includes a container body forming unit where a cylindrical container body is formed from a substantially plane blank of a multilayer material comprising at least a supporting cardboard layer and a weldable, plastic layer. In a welding unit, an end closure, a bottom, is applied to the inside of the container body by inducing welding energy and melting the weldable layer. Such a welded joint is well known to be capable of being gas tight. After welding the bottom edge of the container body is normally processed in an edge shaping unit where the edge typically is folded, heated and curled to provide stability and a more appealing appearance. Also the body blank may be welded together as to form the cylindrical container body, but welding of the end closure is usually a more complex process step.

Often both the container body and the end closure form multilayer structures where a weldable plastic film is applied to the inside of the cardboard based lid and container. In particular for food products, the layer structure usually includes a layer of aluminium arranged between the cardboard and the plastic layer. Typically, a high frequency current energy is induced in the aluminium layer, which foil thereby gets heated and in turn melts the plastic film. Automated equipment of this type further comprises transporting means configured to transport a flow of containers from the container body forming unit to the welding unit and further downstream in the equipment.

Equipment for filling the containers and for sealing and closing the filled containers can be arranged in connection to the container manufacturing equipment.

An important issue in this context is the production rate, i.e. the number of containers per, say, minute that can be manufactured. To be commercially successful, the apparatus used for manufacturing the containers must allow for a high production rate.

A problem when trying to increase the production rate of conventional equipment is that the weldable layer does not get sufficient time to heat up, cool and harden before the containers are removed and transported away from the welding unit. This often results in a damaged and leaking joint. Various heating and cooling devices, as well as different weldable material, have been proposed for carrying out the step of fastening the end closures more quickly but their performance has not been satisfactory.

Thus, there is still a need for equipment of the above mentioned type that allow for a higher production rate.

SUMMARY OF THE INVENTION

An object of this invention is to provide an apparatus and method for manufacturing of containers from blanks of a cardboard based material, which apparatus and method provides for a higher production rate compared to conventional equipment. This object is achieved by the apparatus and method defined by the technical features contained in independent claims 1 and 15. The dependent claims contain advantageous embodiments, further developments and variants of the invention.

The invention concerns an apparatus for manufacturing of containers from blanks of a cardboard based material, said apparatus comprising: a container body forming unit configured to form a cylindrical container body from a substantially plane blank of a multilayer material comprising at least a supporting cardboard layer and a weldable layer; a welding unit configured to fasten an end closure to the container body, said welding unit comprising an inductive welding energy generator for melting of the weldable layer; and transporting means configured to transport a flow of body blanks to the container body forming unit, to transport a flow of container bodies from the container body forming unit to the welding unit, and to transport a flow of container bodies provided with end closures from the welding unit.

The invention is characterized in that the transporting means comprises: a first movable gripping arrangement configured to grip at least two container bodies and move these container bodies simultaneously to the welding unit; and a transferring and positioning arrangement configured to transfer container bodies from the container body forming unit to the first movable gripping arrangement and to position the container bodies in a controlled manner to ensure that the first movable gripping arrangement can grip the at least two container bodies properly, wherein the welding unit is configured to simultaneously fasten an end closure to each of the at least two container bodies.

A main effect of the inventive apparatus is that it allows simultaneous (intermittent) handling of at least two containers during the welding step which in turn allows more time to be spent on the relatively time consuming production step of welding and cooling. In turn, a higher production rate can be used without reducing the quality of the welded joints.

If, for instance, the feeding rate of container bodies through the apparatus is 120 containers per minute (120-pace), which is a desired rate in many commercial applications, a rough calculation yields that only 0.5 s can be spent on each process step in a conventional continuous apparatus. By handling two containers simultaneously this process time can be doubled to 1 s. A process time of around 2 s for welding and cooling (and transport) has shown to be suitable for containers of certain size and certain material. Consequently, in such applications the preferred number of containers that are to be handled simultaneously is four. More generally, the preferred number of containers to be handled simultaneously is 2-6.

A further effect of the inventive apparatus is that the transportation speed of the containers can be reduced during the intermittent handling. This means that also the acceleration and deceleration forces can be reduced, still with a higher output than for handling containers one by one.

In an advantageous embodiment of the invention the transferring and positioning arrangement comprises a rotationally suspended supporting member provided with a ring-formed holding member adapted to receive and hold a container body, wherein the supporting member is configured to allow rotation from a first position, in which the ring-formed holding member is facing in a first direction towards the container body forming unit such as to receive a container body, to a second position, in which the ring-formed holding member is facing in a second direction forming substantially a right angle in relation to the direction of the first position, wherein the transferring and positioning arrangement further comprises a lifting device that is movably adjustable in the second direction and configured to, when the supporting member is in its second position, lift or push out a container body placed in the ring-formed holding member in a direction from a rotational axis of the supporting member.

In an advantageous embodiment of the invention the lifting device comprises a lifting or pushing part intended to contact the container body during lifting/pushing, wherein the ring formed holding member is provided with a slit adapted to allow a portion of the lifting part to pass through and thereby allow the lifting part to lift or push a container body all the way out of the ring formed holding member.

In an advantageous embodiment of the invention the rotationally suspended supporting member is provided with a first and a second ring-formed holding member arranged in relation to each other onto the supporting member in such a way that when the first ring-formed holding member faces in the first direction the second ring-formed holding member faces in the second direction.

In an advantageous embodiment of the invention the rotationally suspended supporting member is provided with four ring-formed holding members evenly distributed in a circumferential manner of the rotationally suspended supporting member.

In an advantageous embodiment of the invention the transferring and positioning arrangement comprises first and second movable guiding members configured to guide the container body when pushed out from the ring-formed holding member by means of the lifting device, said first and second movable guiding members being moveable towards and away from each other between a first and a second position, wherein, in the first position, a space is formed between the guiding members which space is adapted to receive the container body when exiting the ring-formed holding member and to hold the container body in a certain position until the first movable gripping arrangement has gripped the container body, and wherein, in the second position, the guiding members are separated from each other so that the container body can be moved away by the first movable gripping arrangement.

In an advantageous embodiment of the invention the welding unit comprises at least two subunits, each subunit comprising a cavity adapted to receive at least an end part of the container body where the end closure is to be fastened, wherein the inductive welding energy generator, such as a coil, extends around the cavity such as to circumferentially surround a container body placed in the cavity along a distance corresponding to a side edge of an end closure placed in its intended fastening position in the container, each subunit further comprising an end closure positioning device configured to position an end closure in the intended fastening position.

In an advantageous embodiment of the invention the first moveable gripping arrangement comprises a first and a second gripping element arranged to operate on opposite sides of the flow of container bodies, wherein the gripping elements are moveable towards and away from each other for gripping and releasing the container bodies, respectively, and wherein the gripping elements, in a synchronized manner, are movable along the flow of container bodies between the transferring and positioning arrangement and the welding unit for the simultaneous transfer of container bodies, each gripping element being provided with at least two recesses for gripping on each side of a corresponding number of simultaneously gripped container bodies.

In an advantageous embodiment of the invention the apparatus comprises a container edge shaping unit arranged downstream of the welding unit, wherein the edge shaping unit comprises at least two subunits, each subunit comprising a curling pad provided with a curling groove configured to receive and shape the container edge, each subunit further comprising an adjustable container supporting and positioning device configured to hold a container body in place and press it towards the curling pad. Preferably, that the curling pad is mounted a water cooled beam.

In an advantageous embodiment of the invention the transporting means comprises a second movable gripping arrangement configured to grip at least two container bodies and move these container bodies simultaneously from the welding unit to the container edge shaping unit. Preferably, the second movable gripping arrangement is structured in a similar way as the first movable gripping arrangement.

In an advantageous embodiment of the invention the transporting means comprises a third movable gripping arrangement configured to grip at least two container bodies and move these container bodies simultaneously from the container edge shaping unit to an outlet conveyor. Preferably, the third movable gripping arrangement comprises at least two subunits, each subunit comprising a set of suction gripper configured to grip a container body on one of its sides, said set of suction grippers being arranged on a rotationally suspended arm capable of rotating the container body 180° during the transfer from the container edge shaping unit to the outlet conveyor.

The invention also concerns a method for manufacturing of containers from blanks of a cardboard based material, said method comprising the steps of: —forming, in a container body forming unit, a cylindrical container body from a substantially plane blank of a multilayer material comprising at least a supporting cardboard layer and a weldable layer; —fastening, in a welding unit, an end closure to the container body by generating an inductive welding energy for melting of the weldable layer; and—transporting: a flow of body blanks to the container body forming unit; a flow of container bodies from the container body forming unit to the welding unit; and a flow of container bodies provided with end closures from the welding unit.

The inventive method comprises the steps of: —gripping, by means of a first movable gripping arrangement, at least two container bodies and moving these container bodies simultaneously to the welding unit; and—transferring, by means of a transferring and positioning arrangement, container bodies from the container body forming unit to the first movable gripping arrangement and positioning the container bodies in a controlled manner to ensure that the first movable gripping arrangement can grip the at least two container bodies properly, and—fastening an end closure simultaneously to each of the at least two container bodies.

BRIEF DESCRIPTION OF DRAWINGS

In the description of the invention given below reference is made to the following figure, in which.

DESCRIPTION OF EXAMPLE EMBODIMENTS OF THE INVENTION

Figure 1:
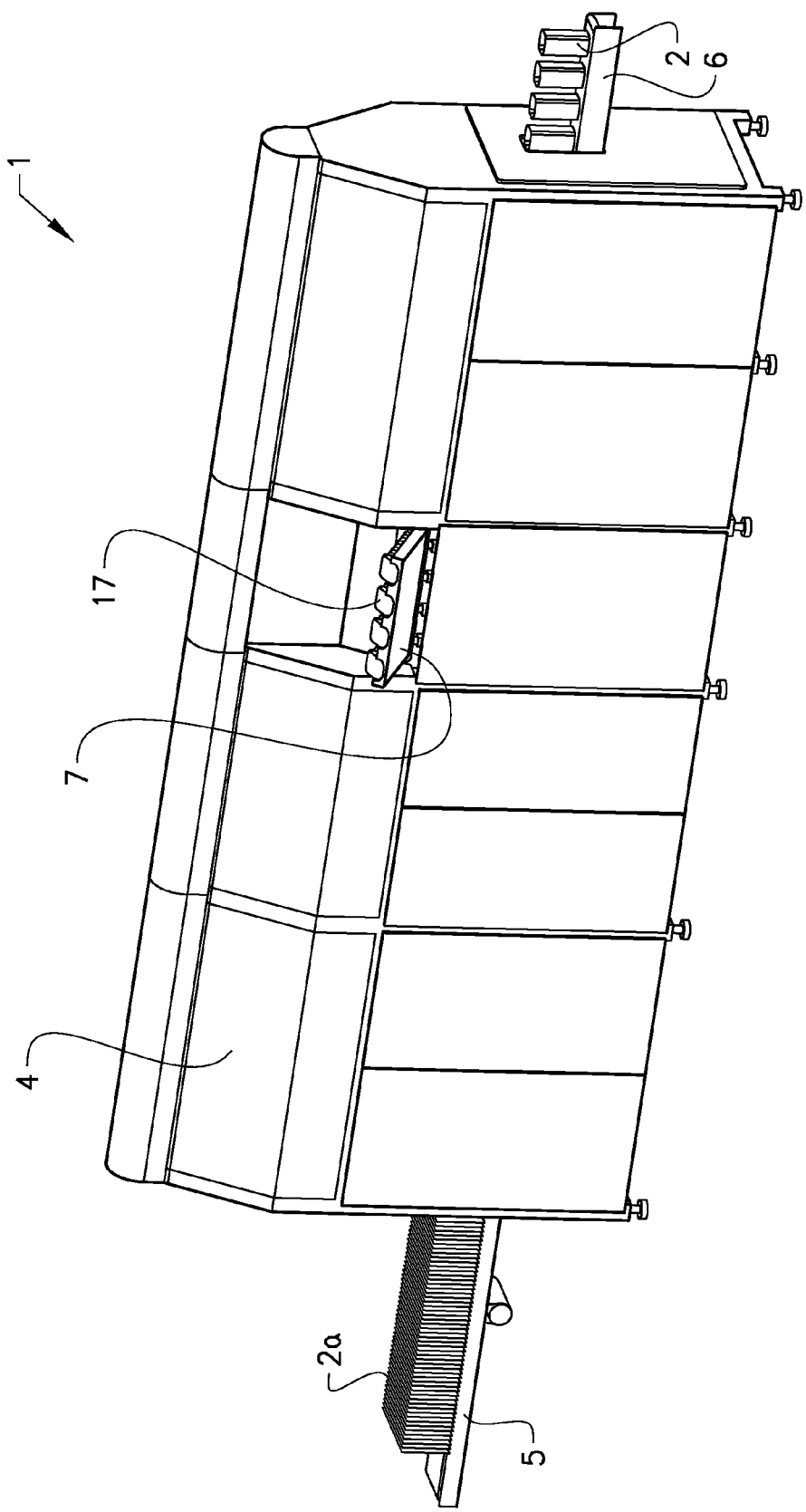
FIG. 1 shows, in a perspective view, a preferred embodiment of an apparatus according to the invention.

FIG. 1 shows, in a perspective view, a preferred embodiment of an inventive apparatus 1 for manufacturing of containers 2 from blanks 2a of a cardboard based material. A housing 4 is arranged to surround the apparatus 1. An inlet conveyor 5 feeds vertically positioned body blanks 2a to the apparatus 1 and an outlet conveyor 6 feeds containers 2 away from the apparatus 1. An end closure supply unit 7 with end closures 17 can be seen in FIG. 1.

Figure 2:
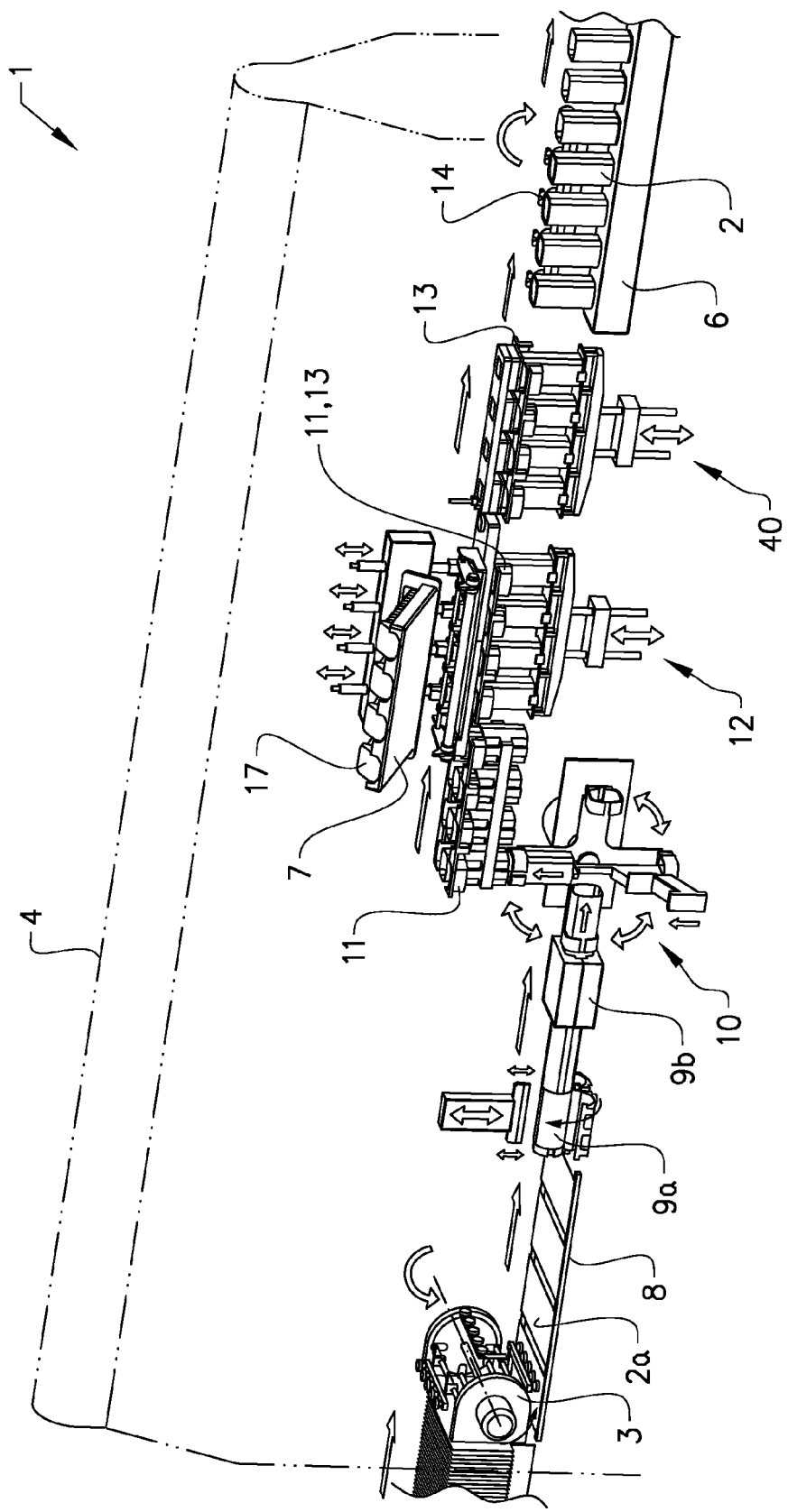
FIG. 2 shows parts of the inside of the apparatus shown in FIG. 1.

FIG. 2 shows parts of the inside of the apparatus 1 shown in FIG. 1. From left to right in FIG. 2, i.e. from inlet side to outlet side of the apparatus 1. it is shown a blank picker 3, a body blank 2a placed horizontally onto a conveyor 8, a container body welding station 9a, a body shaping station 9b, a container body transferring and positioning arrangement 10, a first movable gripping arrangement 11, end closures 17 arranged in the end closure supply unit 7, a welding unit 12, a second movable gripping arrangement 13, a container edge shaping (curling) unit 40, a third movable gripping arrangement 14, and the outlet conveyor 6.

The apparatus 1 comprises a container body forming unit configured to form the cylindrical container body 2 from the substantially plane blank 2a of a multilayer material comprising at least a supporting cardboard layer and a weldable layer. Blank picker 3, conveyor 8, container body welding station 9a and body shaping station 9b form part of the container body forming unit.

The transferring and positioning arrangement 10 is configured to transfer a flow of container bodies one by one from the container body forming unit to the first movable gripping arrangement 11 and to position the container bodies 2 in a controlled manner to ensure that the first movable gripping arrangement 11 can grip the container bodies 2 properly, The first movable gripping arrangement 11 is configured to grip a plurality of container bodies 2, in this example four, and move these container bodies 2 simultaneously to the welding unit 12. From the first movable gripping arrangement 11 and further in the machine direction, the container bodies 2 are handled four by four in an intermittent manner (until they reach the outlet conveyor 6). Accordingly, the second movable gripping arrangement 13 is configured to grip four container bodies 2 at the welding unit 12 and move these container bodies 2 simultaneously to the edge shaping unit 40. Similarly, the third movable gripping arrangement 14 is configured to grip four container bodies 2 at the edge shaping unit 40 and move these container bodies 2 simultaneously to the outlet conveyor 6. The third movable gripping arrangement 14 differs from the other two: it grips the container bodies 2 only from one side and rotates the bodies 180° during transport so that the end closure 17 faces downwards. An apparatus for filling the containers with, for instance, a food powder may be arranged in connection to the outlet conveyor 6.

The welding unit 12 is configured to fasten an end closure 17 to each of the container bodies using an inductive welding energy generator 25 for melting of the weldable layer. In this case the welding unit is capable of simultaneously fasten end closures 17 to four container bodies 2 (se FIG. 6).

The transferring and positioning arrangement 10, the movable gripping arrangements 11, 13, 14 and various conveyors form transporting means configured to transport a flow of body blanks 2a to the container body forming unit and from there transport a flow of container bodies 2 further via the welding unit 12 and the edge shaping unit 40.

Figure 3:
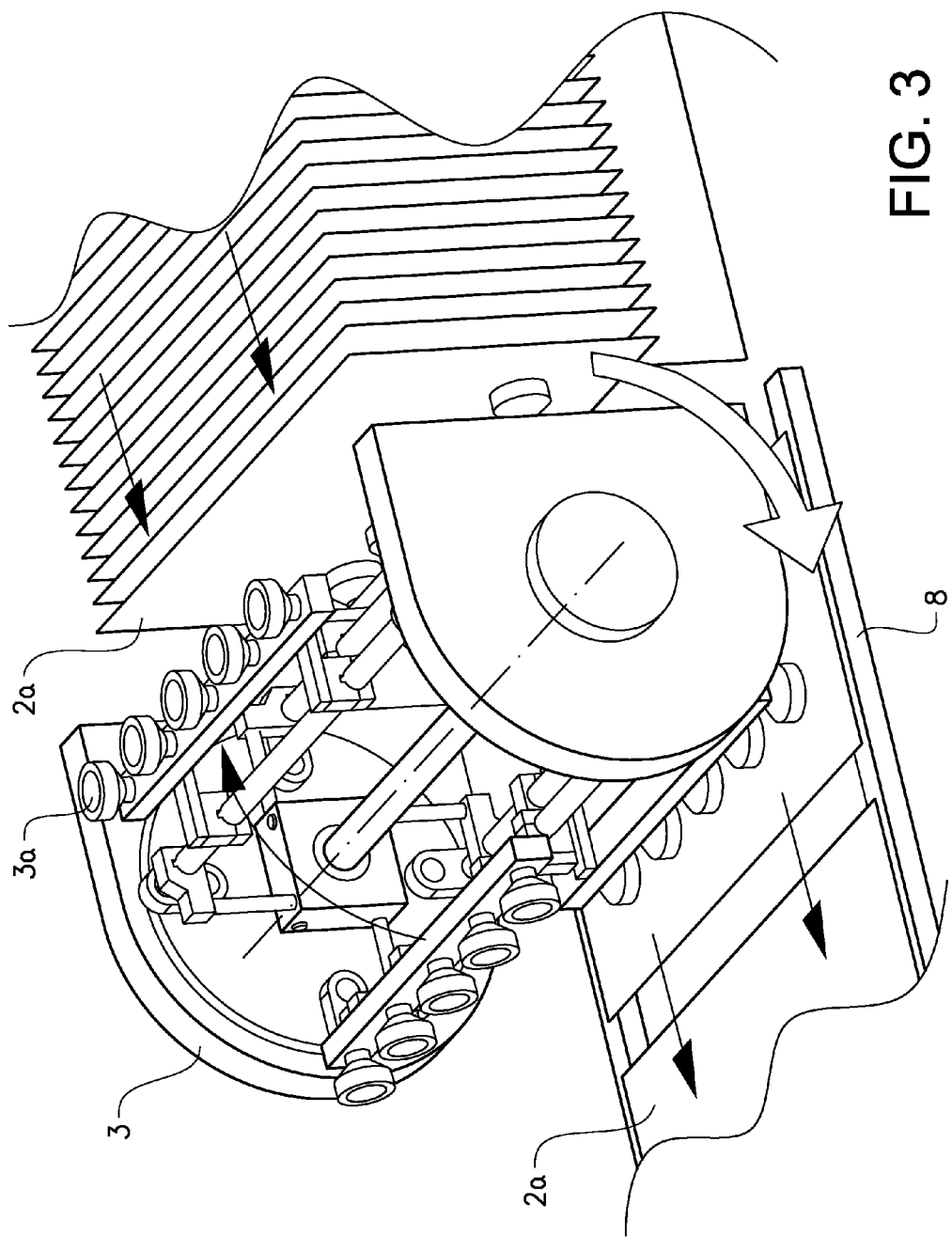
FIG. 3 shows a part of a container body forming unit of the apparatus shown in FIG. 1, FIGS. 4A-4D show another part of the container body forming unit of the apparatus shown in FIG. 1, FIGS. 5A-5F show a transferring and positioning arrangement of the apparatus shown in FIG. 1, FIGS. 6A-6E show the function of a welding unit of the apparatus shown in FIG. 1, FIGS. 7A-7C show a container edge shaping unit of the apparatus shown in FIG. 1, and FIGS. 8A-8C show a third moveable gripping arrangement and an outlet conveyor of the apparatus shown in FIG. 1.
Figure 4B:
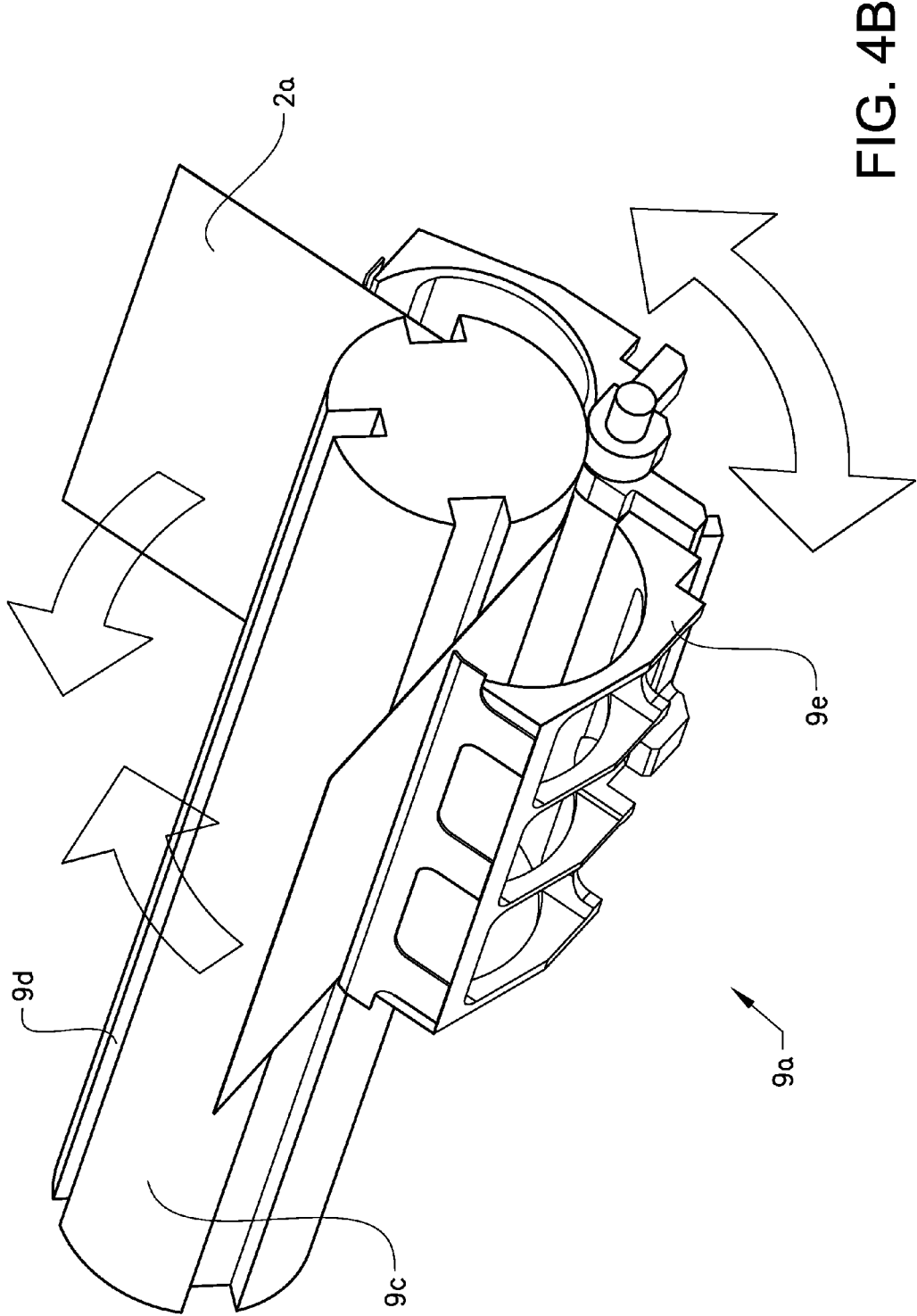
Figure 4C:
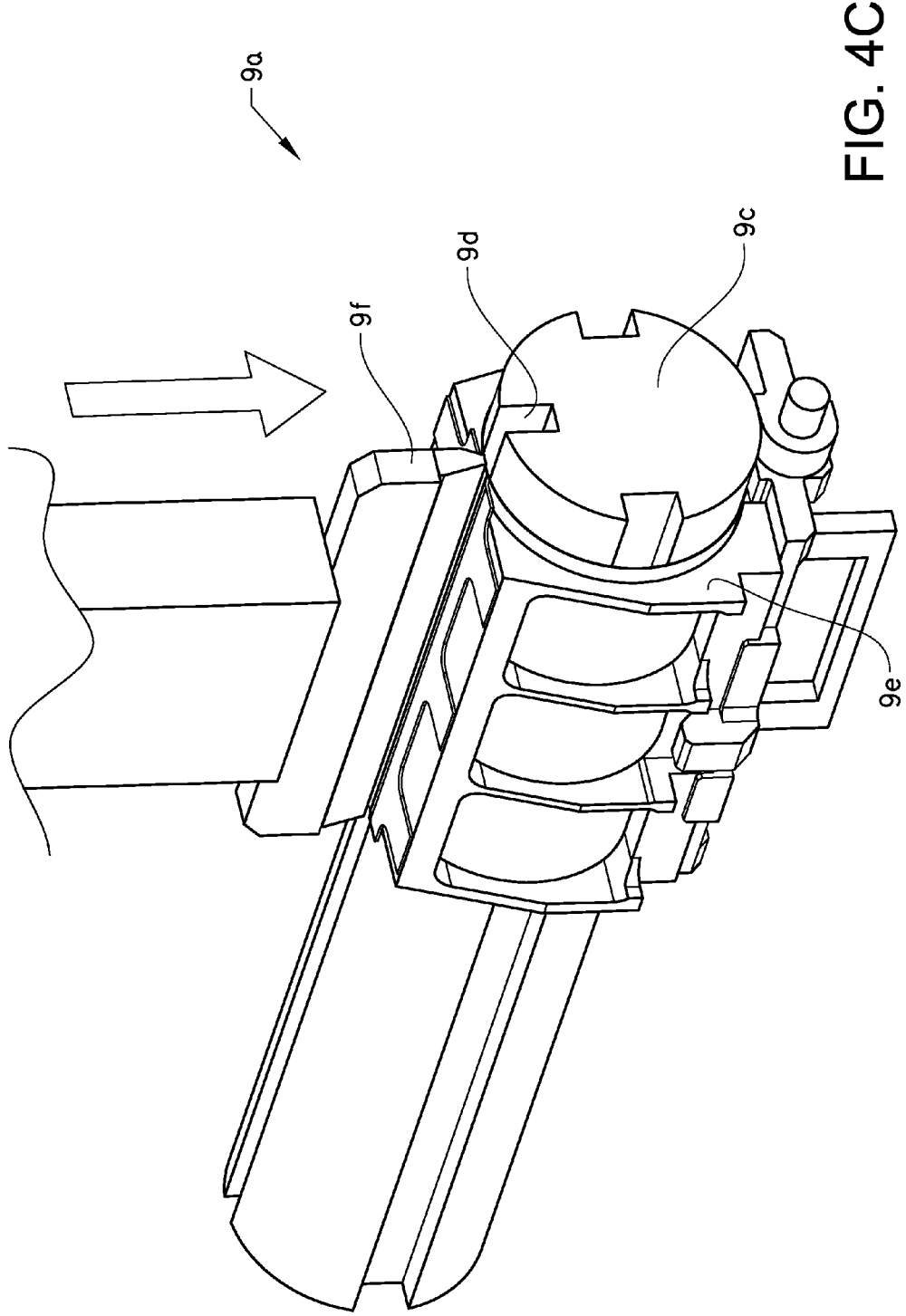

FIG. 3 shows that the blank picker 3 comprises four rows of suction cups 3a, wherein the rows are circumferentially distributed on a rotationally arranged supporting member having an axis of rotation that is horizontal and perpendicular to the machine direction. By rotating the supporting member the suction cups 3a can pick one vertically positioned blank 2a at a time and place it horizontally onto the conveyor 8.

FIGS. 4A-4D show the container body welding station 9a of the forming unit. Main parts are a cylindrical inner forming element 9c extending in the machine direction (the direction of the flow the containers) and having a circular cross section, an openable/closable outer forming element 9e adapted to fit around the inner forming element 9c and a pressing element 9f. A recess 9d extends along the inner forming element 9c. In this recess 9d a coil (not shown) is arranged for inducing welding energy into an electrically conduction layer of the blank 2a. A teflon material may be arranged onto the coil to prevent that the blank 2a get stuck to the inner forming element 9c during welding.

As can be seen in FIGS. 4A-4D, the outer forming element 9e comprises two halves that can be closed around the inner forming element 9c with the blank 2a clamped in between such as to overlap itself along the recess 9d. The pressing element 9f puts a welding pressure towards the coil, along the overlap of the blank 2a, during welding.

The longitudinal welding of the container body 2 carried out in the container body welding station 9a is normally not critical with regard to production rate.

In the body shaping station 9b the cross section of the circular container body produced in the welding station 9a is shaped to a desired shape, FIGS. 5A-5F show the transferring and positioning arrangement 10 and the first moveable gripping arrangement 11.

The transferring and positioning arrangement 10 comprises a rotationally suspended supporting member 10a in the form of a cross. Each arm of the cross 10a is provided with a ring-formed holding member 10b adapted to receive and hold a container body 2. The cross-shaped supporting member 10a is rotationally suspended and has an axis of rotation that is horizontal and perpendicular to the machine direction. Each ring-formed holding member 10b is fastened to the supporting member 10a sideways with its open, container-receiving sides facing towards, and away, from the axis of rotation, respectively.

The member 10a is, during operation of the apparatus 1, rotated stepwise in steps of 90°. This means that it can be rotated from a first position, in which a particular ring-formed holding member 10b is facing in a first direction (which in this example is horizontally and opposite to the machine direction) towards the body shaping station 9b of the container body forming unit such as to be capable of receiving a container body 2 fed to towards the transferring and positioning arrangement 10, to a second position, in which the same ring-formed holding member 10b now is facing in a second direction (which in this example is vertically upwards) forming substantially a right angle in relation to the direction of the first position.

The transferring and positioning arrangement 10 further comprises a lifting device 10d that is movably adjustable in the second direction (i.e. it is vertically adjustable) and configured to, when the rotationally suspended supporting member 10a is in its second position, lift or push out a container body 2 placed in the ring-formed holding member 10b in a direction from the rotational axis of the supporting member 10a (i.e. upwards).

The lifting device 10d comprises a lifting or pushing part 10e intended to contact the container body 2 during lifting/pushing. Each ring formed holding member 10b is provided with a slit 10c adapted to allow a portion of the lifting part 10e to pass through the slit 10c and thereby allow the lifting part 10e to lift or push a container body 2 all the way out of the ring formed holding member 10b.

In the example shown here, the rotationally suspended supporting member 10a is provided with four ring-formed holding members 10b evenly distributed in a circumferential manner of the rotationally suspended supporting member 10a. Thus, each step the member 10a is rotated an adjacent pair of ring-formed holding members 10b will be facing in the two directions as described above.

The transferring and positioning arrangement 10 further comprises first and second movable guiding members 10f, 10g configured to guide the container body 2 when it is pushed up and out from the ring-formed holding member 10b by means of the lifting device 10d. The first and second movable guiding members 10f, 10g are moveable arranged as to allow motion towards and away from each other between a first and a second position. In the first position (see FIGS. 5A-5D) the guiding members 10f, 10g are moved together and form four spaces or recesses between the guiding members 10f, 10g. Each of these spaces is adapted to receive the container body 2 when it exits the ring-formed holding member 10b and to hold the container body 2 in a certain position so that the first movable gripping arrangement 11 can grip the container body 2. In the second position (see FIGS. 5E-5F), the guiding members 10f, 10g are separated from each other so that the container body 2 can be moved away by the first movable gripping arrangement 11.

The first and second movable guiding members 10f, 10g are also arranged to be moveable in a synchronized manner in the machine direction to allow that each of the spaces or recesses formed between the guiding members 10f, 10g when they are in the first position can be positioned above and in line with the ring shaped holding member 10b from which a container body 2 is lifted. This way all four spaces of the movable guiding members 10f, 10g can be occupied with a container body 2, which allows the first moveable gripping arrangement to grip all four container bodies 2 simultaneously.

Figure 5A:
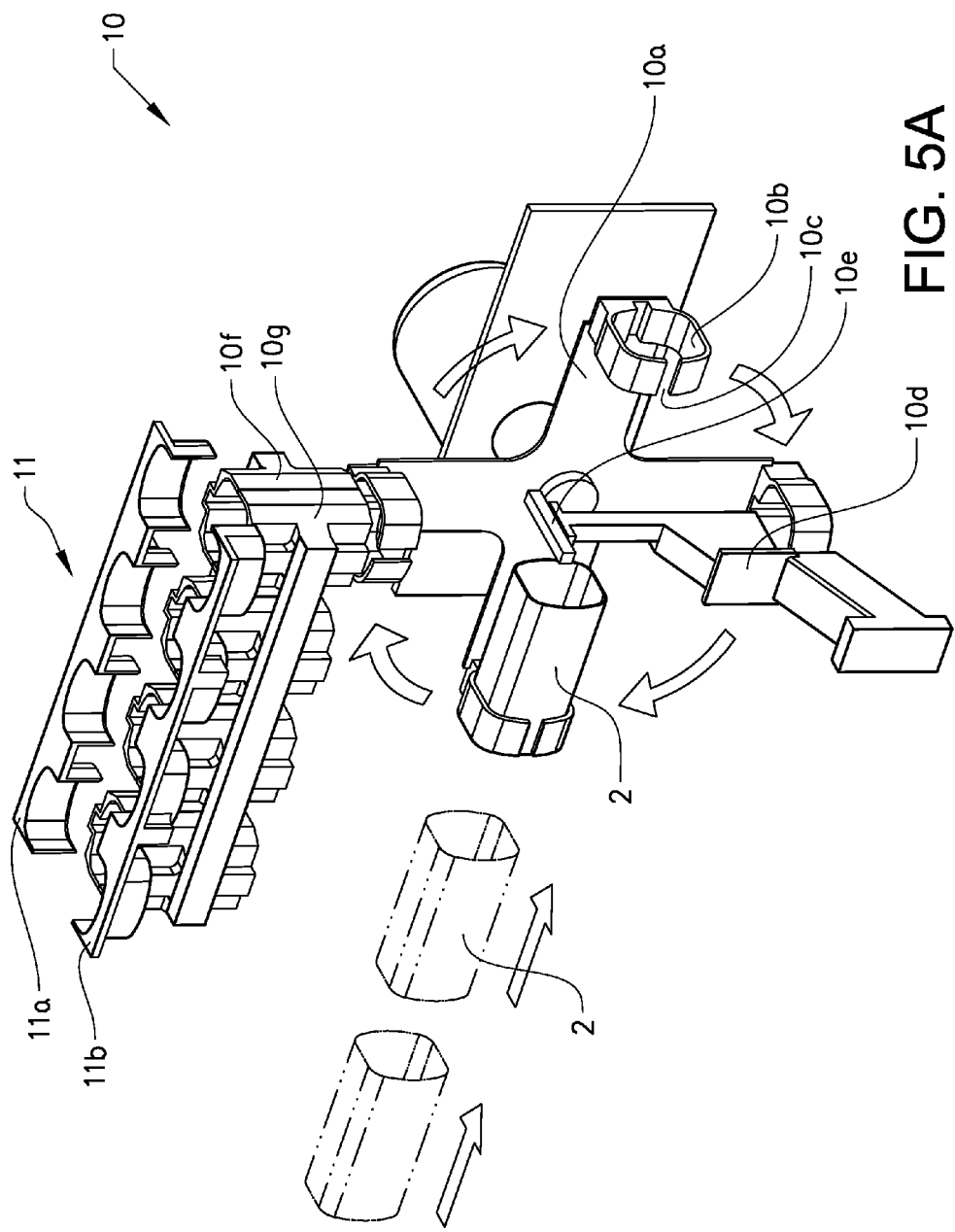

The first moveable gripping arrangement 11 comprises a first and a second gripping element 11a, 11b arranged to operate on opposite sides of the flow of container bodies 2 (see FIG. 5A). In similarity to the guiding members 10f, 10g, the gripping elements 11a, 11b are moveable towards and away from each other for gripping and releasing the container bodies 2, respectively, and they are also moveable, in a synchronized manner, in a direction along the flow of container bodies 2. The gripping elements 11a, 11b are moveable between the transferring and positioning arrangement 10 and the welding unit 12 for the simultaneous transfer of four container bodies 2. Each gripping element 11a, 11b is provided with four recesses for gripping on each side of a corresponding number of simultaneously gripped container bodies 2. When the gripping elements 11a, 11b are moved towards each other the recesses form spaces in similarity with the guiding members 10f, 10g. The distance between container bodies 2 placed in the first movable gripping arrangement 11 and in the guiding members 10f, 10g is the same.

Arrangements for allowing and controlling the movement of the movable guiding and gripping members/elements can be designed in different ways and this is not described here.

Figure 5B:
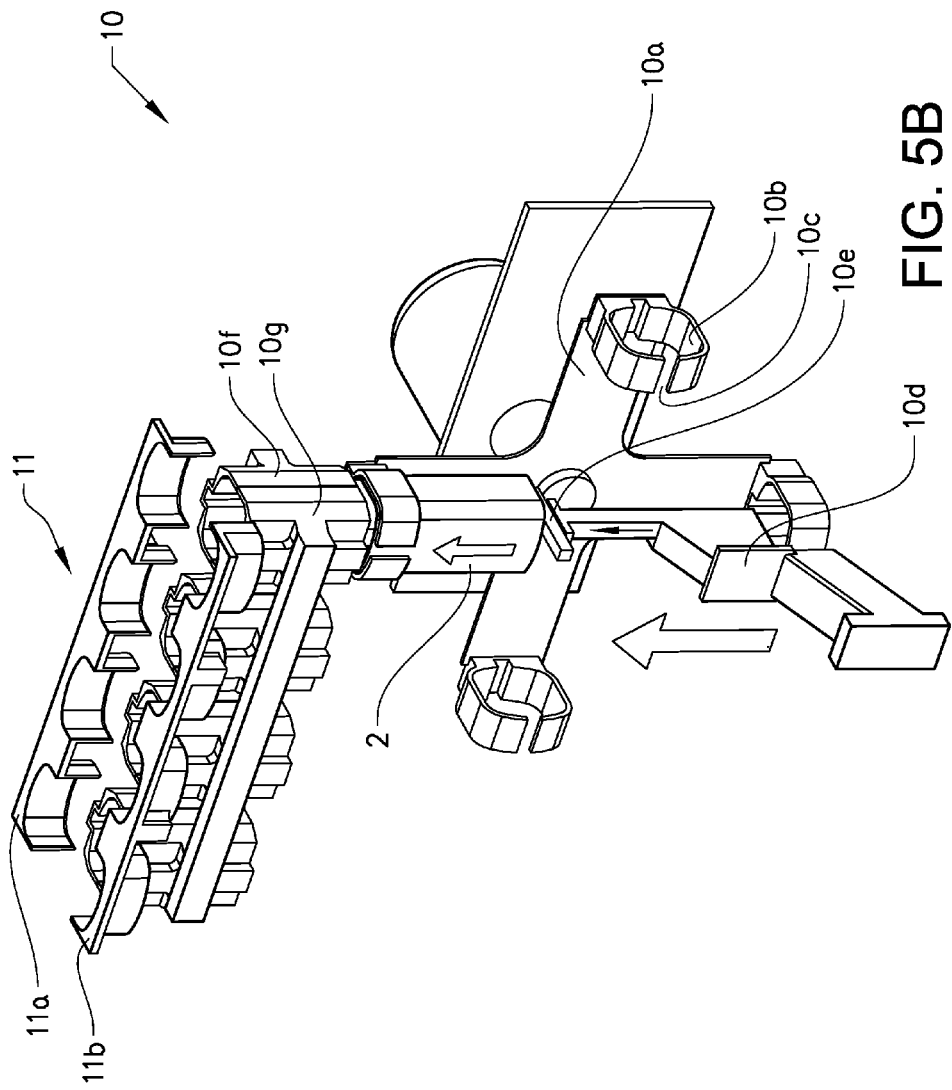
Figure 5C:
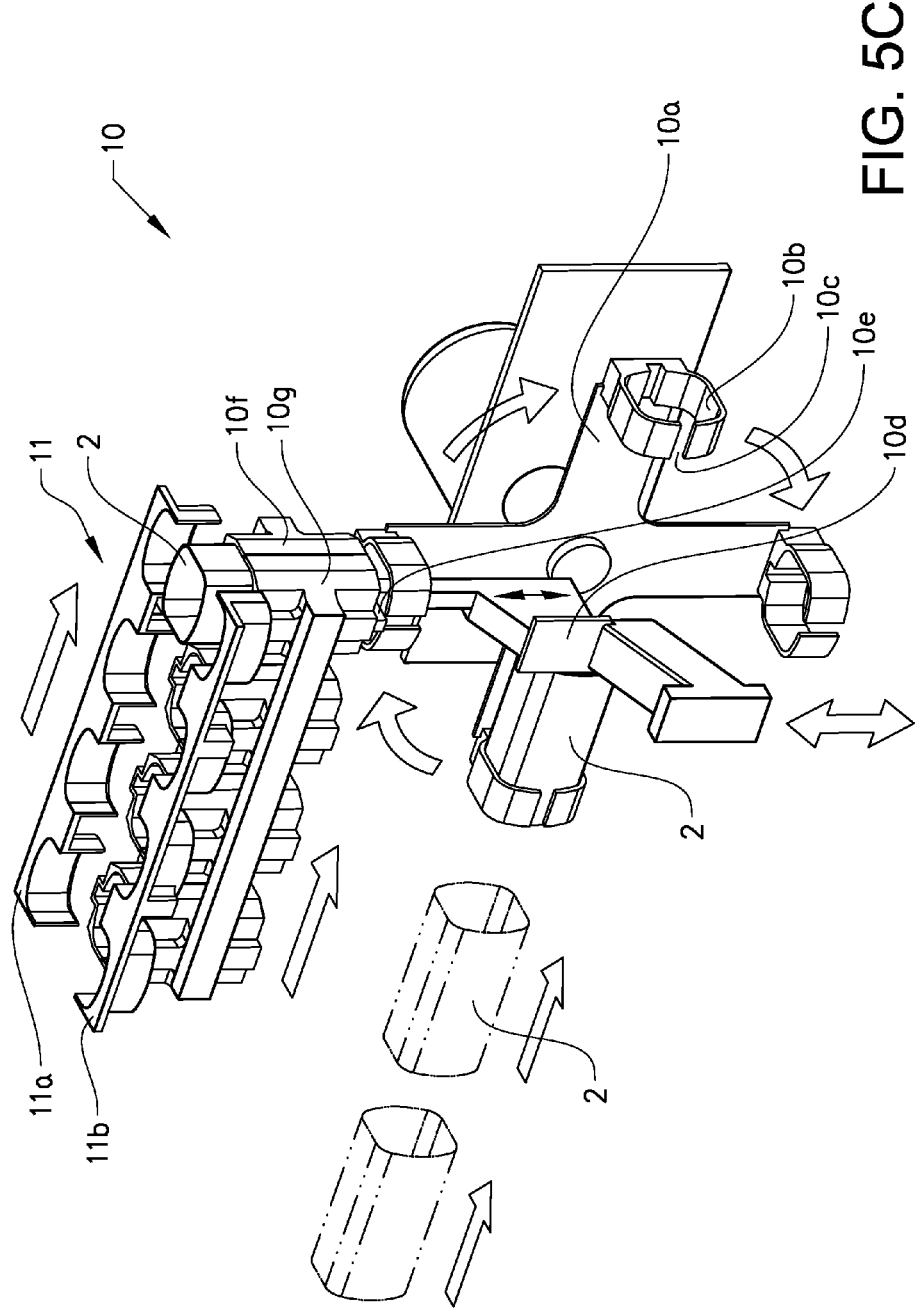

FIG. 5A shows a container body placed in the ring formed holding member 9b facing in the first direction. Arrows indicate movements of the rotationally suspended supporting member 10a and of container bodies 2. In FIG. 5B the rotationally suspended supporting member 10a has been rotated 90° so that the same container body 2 now is facing upwards. The lifting device 10d is about to lift the container body 2 into a first space formed between the guiding members 10f, 10g in a direction indicated by arrows. In FIG. 5C the container body 2 has exited the ring formed holding member 9b and the lift is completed. Arrows indicate that lifting device 10d is about to move downwards and that the guiding members 10f, 10g are about to move in the machine direction to allow the next container body 2 to be transferred to the next space formed between the guiding members 10f, 10g.

Figure 5D:
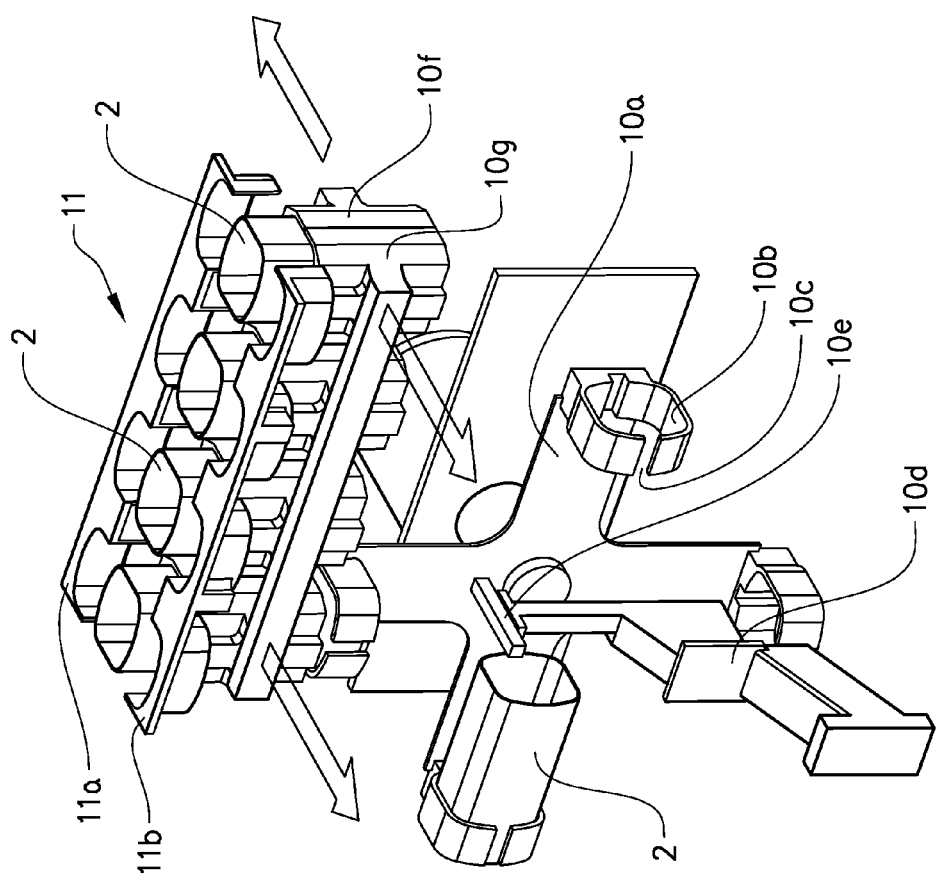
Figure 5E:
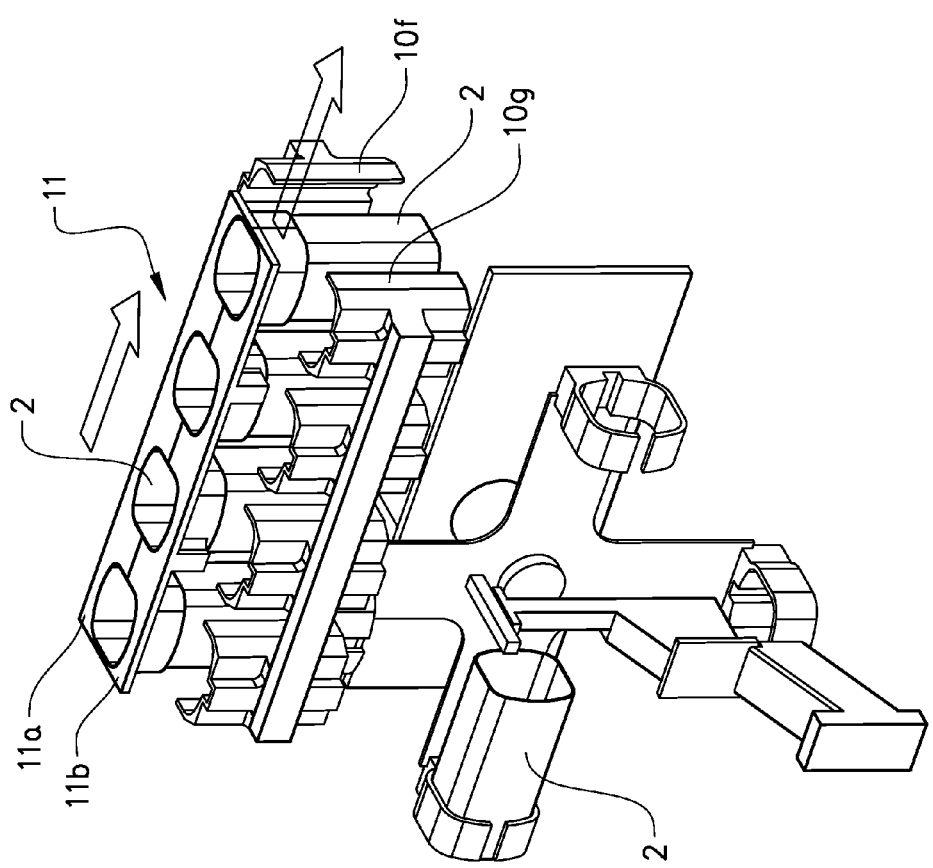
Figure 5F:
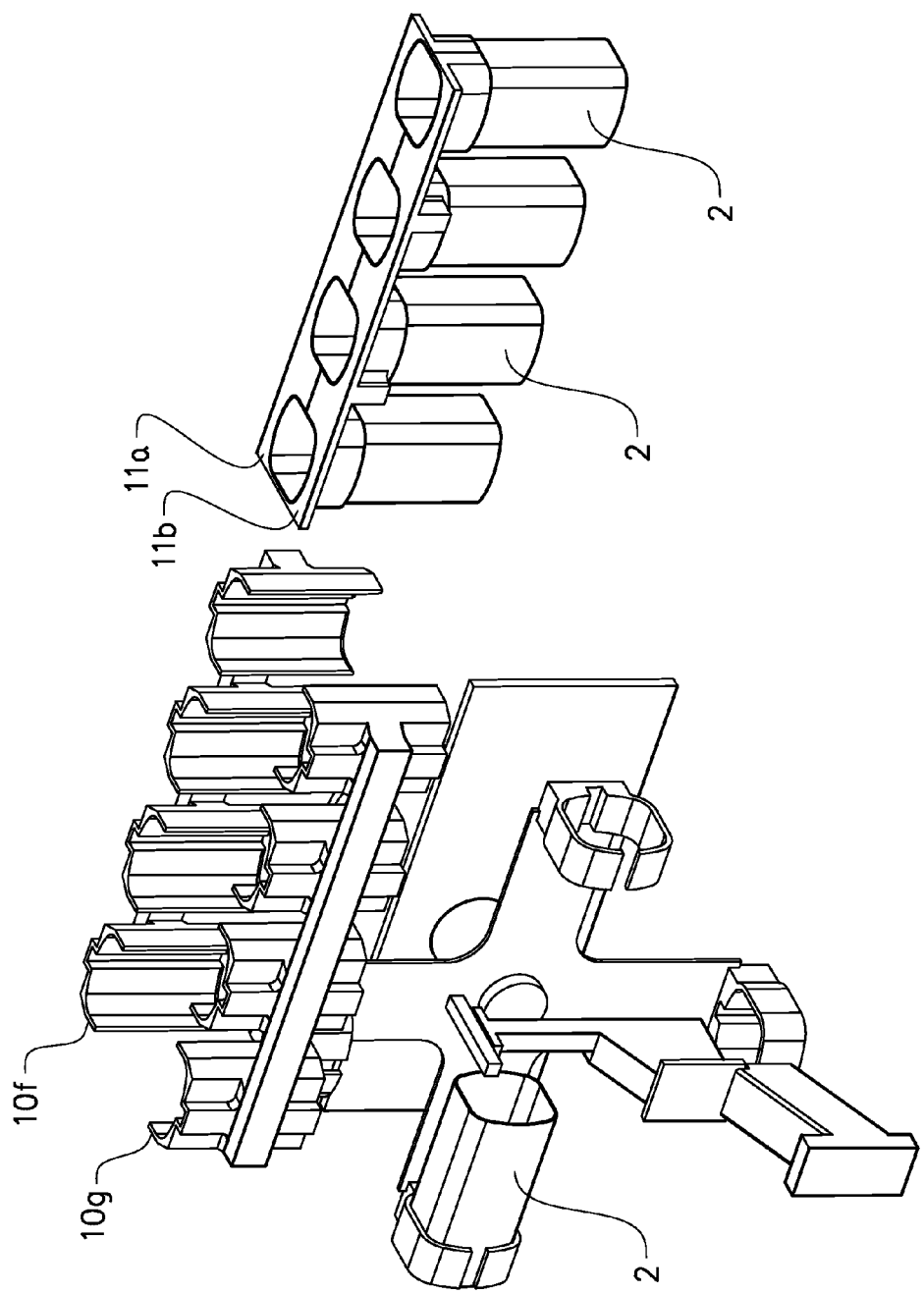

In FIG. 5D four container bodies 2 have been placed between the guiding members 10f, 10g. A part of each body 2 protrudes above the guiding members 10f, 10g to allow gripping of the first movable gripping arrangement 11. Arrows indicate that the guiding members 10f, 10g can be moved away from each other as soon as the gripping elements 11a, 11b have been moved together as to grip the four bodies 2. In FIGS. 5E and 5F the guiding members 10f, 10g have been separated and the gripping arrangement 11 is on its way with the four container bodies 2 towards the welding unit 12. To unload the container bodies 2 at the welding unit 12, the gripping elements 11a, 11b are separated when the container bodies 2 have been properly positioned.

Preferably, a set of four container bodies 2 are transferred and loaded into the spaces of the guiding members 10f, 10g while the first gripping arrangement 11 transports a previous set of container bodies 2 to the welding unit 12 and moves back to the guiding members 10f, 10g. In such a case, the first gripping arrangement 11 is not located close to the guiding members 10f, 10g during loading as shown in FIGS. 5A-5C.

FIGS. 6A-6E show the function of the welding unit 12 that comprises four subunits arranged in a row along the main transport direction of the apparatus 1. Each subunit comprises a cavity 21 adapted to receive an end part of the container body 2 where the end closure 17 is to be fastened. The inductive welding energy generator, in this example a coil 25 (see FIGS. 6A and 6E), extends around the cavity 21 such as to circumferentially surround a container 2 placed in the cavity 21 along a distance corresponding to a side edge of an end closure 17 placed in its intended fastening position in the container body 2. Each subunit further comprising an end closure positioning device 22 configured to position an end closure 17 in the intended fastening position inside the container 2, i.e. in a position in level with the coil 25.

The end closure positioning device 22 is vertically adjustable and capable of pressing down an end closure 17 into the container 2 to the desired welding position. The end closure positioning device 22 is further expandable in a radial direction of the cavity 21 such as to press a folded edge of an end closure 17 circumferentially towards the coil 25, i.e. towards an inside of the container body 2 placed in the cavity 21 along a line levelled with the coil 25.

The welding unit 12 further comprises a container supporting and positioning device 23 configured to position each of the containers 2 in its corresponding cavity 21 by lifting the container 2 to a desired position.

The welding unit 12 further comprises an end closure supplier 24 comprising a stationary but rotationally suspended first rod 30 and suction grippers 28 arranged on a rotationally suspended second rod 29, said first and second rods 30, 29 being substantially parallel and connected via connecting rods 31. The welding unit 12 also comprises an end closure transfer plate 26 provided with four end closure cavities 27. The end closure supplier 24 is configured to transfer end closures 17 from the end closure supply unit 7 to the transfer plate 26 and simultaneously place an end closure 17 in each of the end closure cavities 27. This is done by gripping end closures 17 at the end closure supply unit 7, rotating the first rod 30 as to transfer the gripped end closures 17 towards the transfer plate 26, rotating the second rod 29 as to rotationally direct the end closures 17 properly towards the end closure cavities 27.

The end closure transfer plate 26 is transversally moveable between a first position at a side of the row of welding subunits, in which position the end closures 17 are placed in the end closure cavities 27, and a second position in line with the welding subunits, below the end closure positioning devices 22 and above the container cavities 21. In this second position the end closures are aligned with the end closure positioning devices 22 and the container cavities 21 so that the end closures 17 can be pushed down through the end closure cavities 27 into their corresponding container 2 placed in the container cavity 21.

Figure 6A:
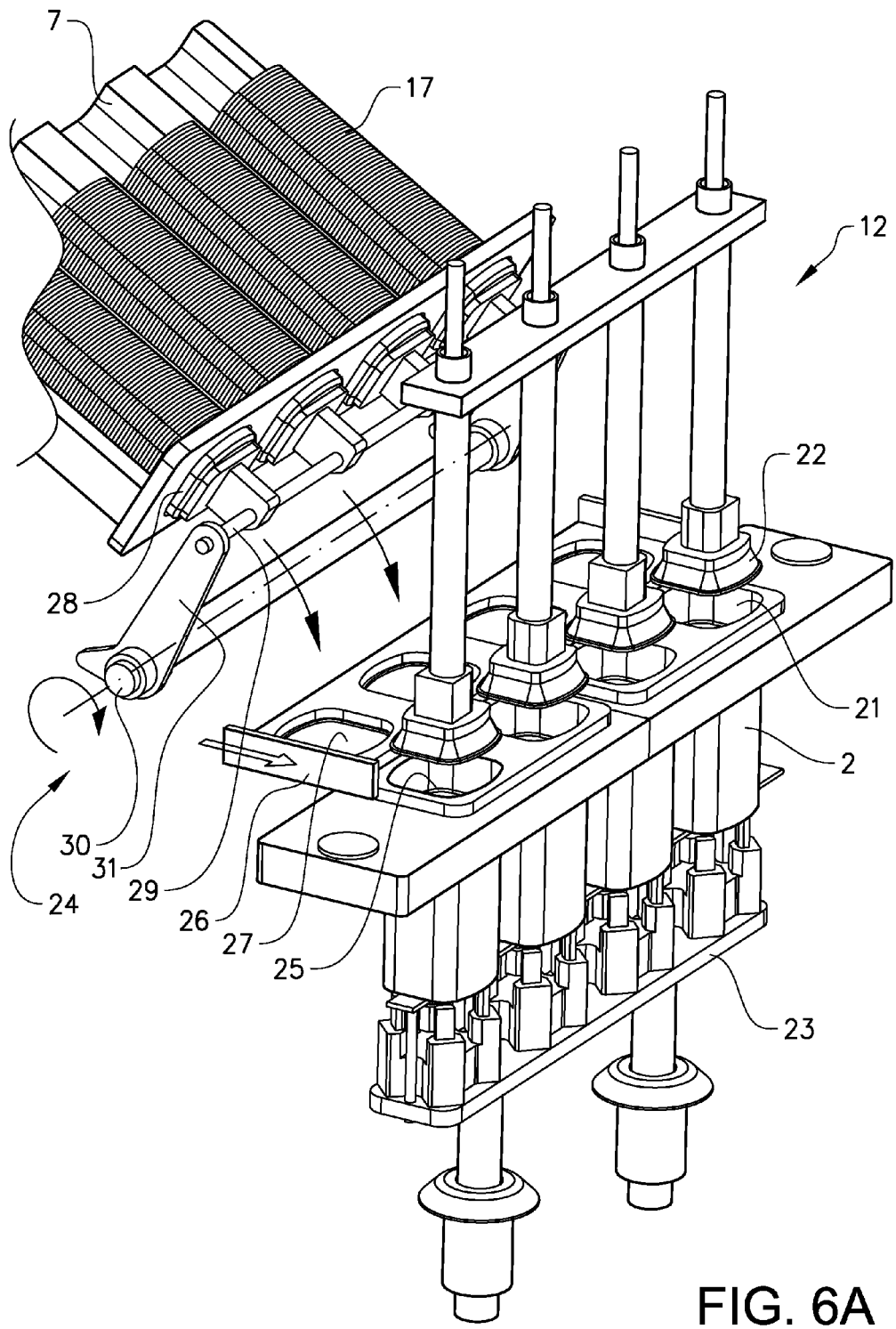

In FIG. 6A solid arrows indicate that the end closure supplier 24 is about to transfer end closures 17 to the transfer plate 26 which is in its first position. Another arrow indicates the direction towards the second position of the transfer plate 26. The container supporting and positioning device 23 is in a lower position. The end closure positioning device 22 is in an upper position.

Figure 6B:
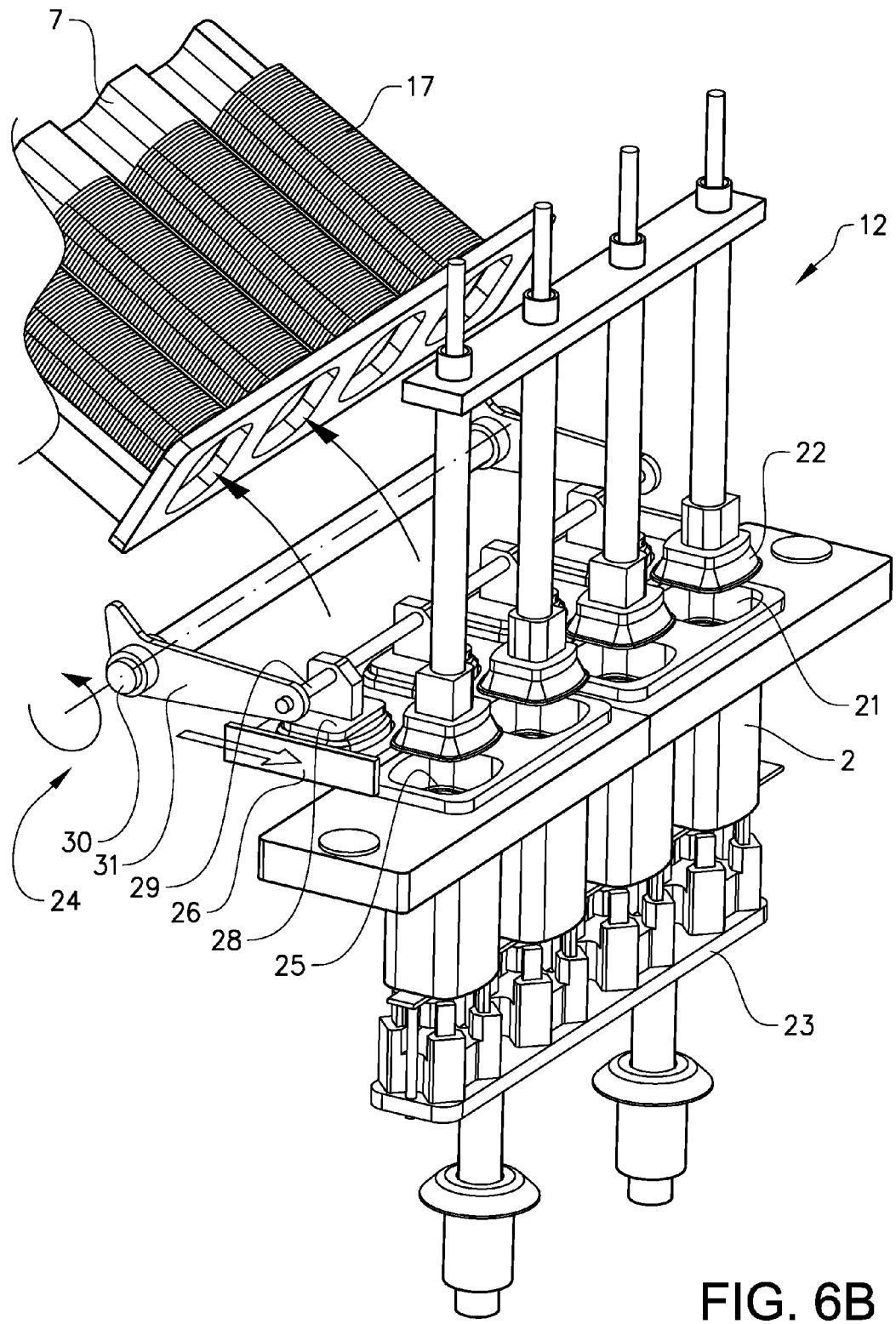

In FIG. 6B the end closures 17 have been transferred to the transfer plate 26 and positioned in their corresponding end closure cavities 27 by rotating the end closure supplier around the first rod 30. During this rotation also the second rod 29 rotates.

Figure 6C:
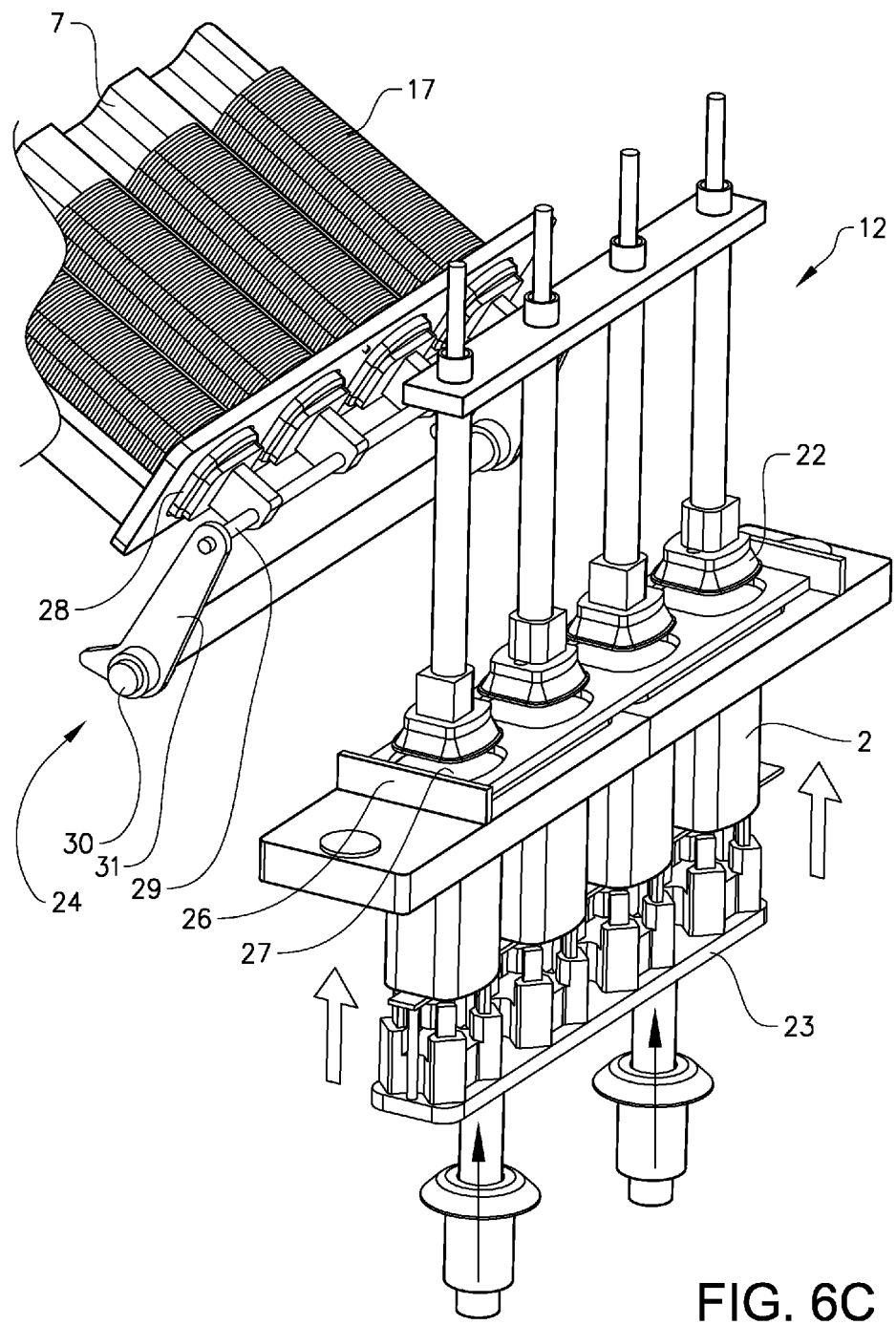

In FIG. 6C the transfer plate 26 has moved to its second position, Arrows indicate that the container supporting and positioning device 23 has started to move towards an upper position as to position the containers 2 in the container cavities 21.

Figure 6D:
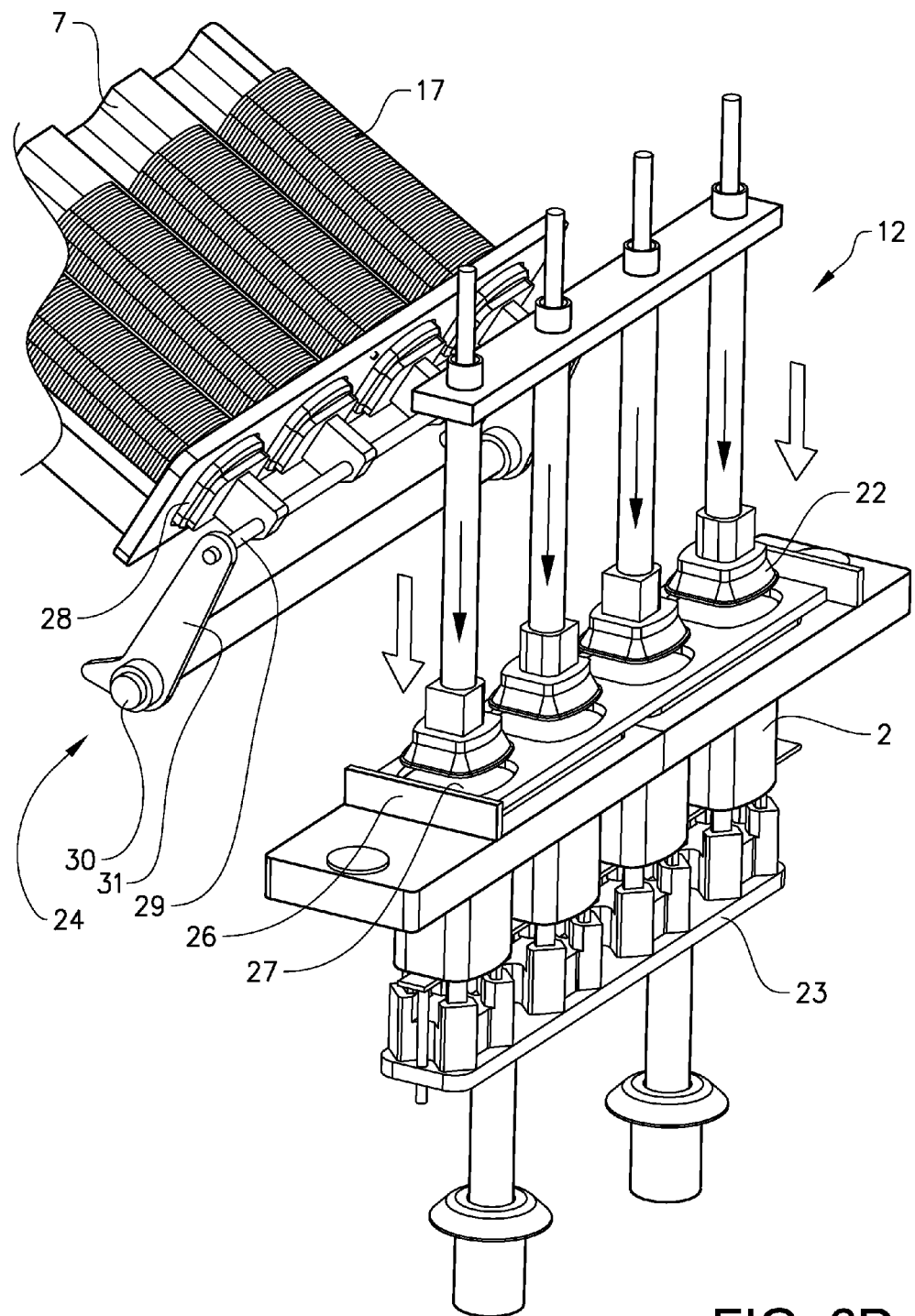

In FIG. 6D the container supporting and positioning device 23 has reached its upper position and the containers 2 are now properly positioned in the container cavities 21. Arrows indicate that the end closure positioning device 22 is about to be moved to a lower position.

Figure 6E:
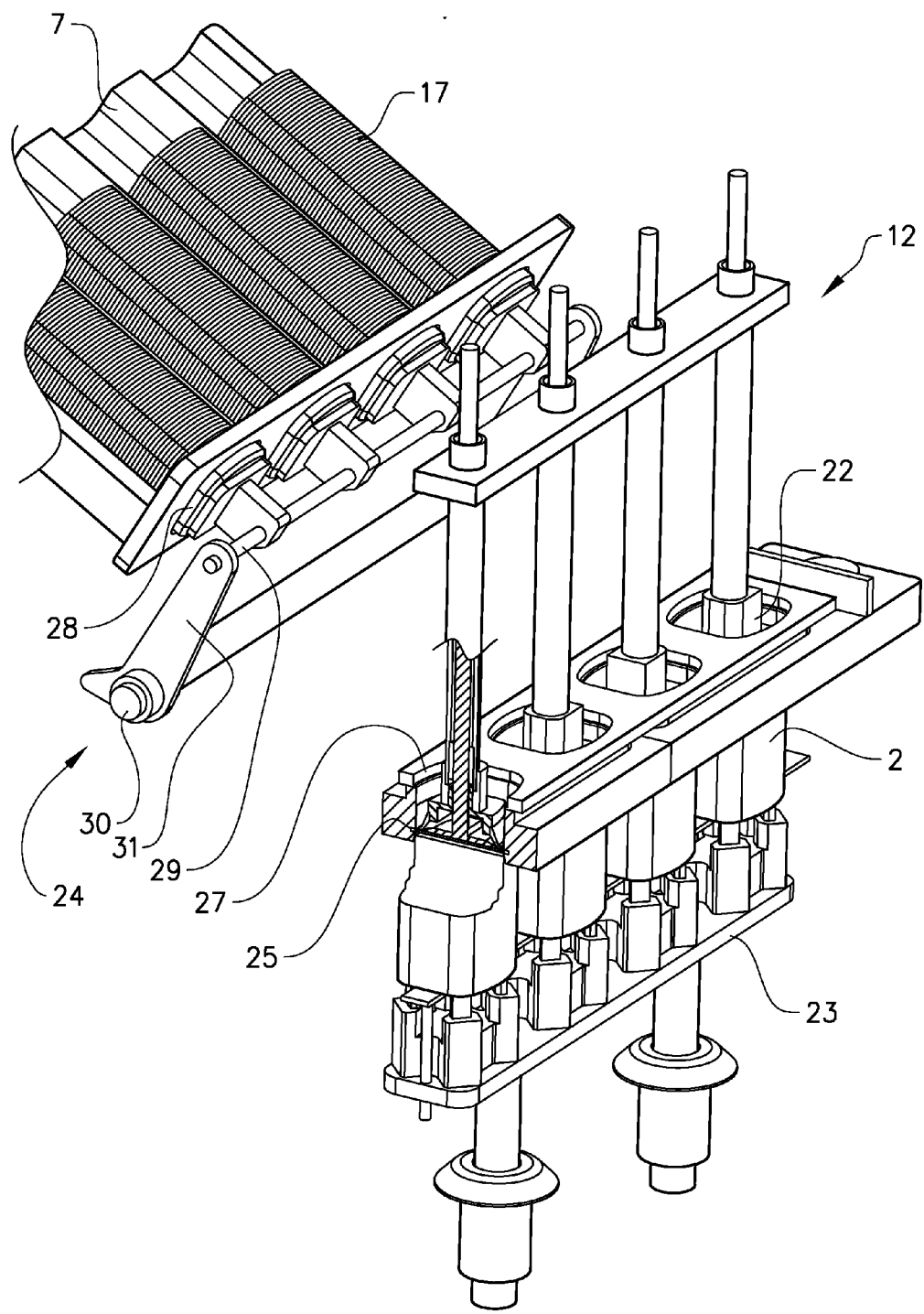

In FIG. 6E the end closure positioning device 22 has reached its lower position and the end closure 17 has now been pressed down through the end closure cavity 27, which comprises a flange that supports the end closure 17 and that provides the end closure 17 with a folded edged when the end closure 17 is pressed through the end closure cavity 27, and further down into the container 2 to the desired welding position above the powder 3 in the container 2. At this stage the end closure positioning device 22 expands in a radial direction of the cavity 21 and presses the folded edge of the end closure 17 towards the inside of the wall of the container 2 and further towards the circumferentially arranged coil 25. By supplying current to the coil 25 heat is inductively generated in electrically conductive layers in the end closure 17 and the container 2 in positions sufficiently close to the coil 25. The heat melts weldable layers of the end closure 17 and the container 2, and the expansion of the end closure positioning device 22 provides for a pressure that provides for a tight contact between the end closure 17 and the container 2. The pressure is maintained for a short time period after the coil current has been turned off so that the weldable layer gets sufficient time to cool and harden.

When the welding process is completed the end closure positioning device 22 is moved to its upper position, the transfer plate 26 is moved to its first position and the container supporting and positioning device 23 is moved to its lower position. The containers bodies 2 provided with end closures can now be moved and be replaced with new container bodies 2 by means of the first and second movable gripping arrangements 11, 13, which are structured in the same way.

Figure 7A:
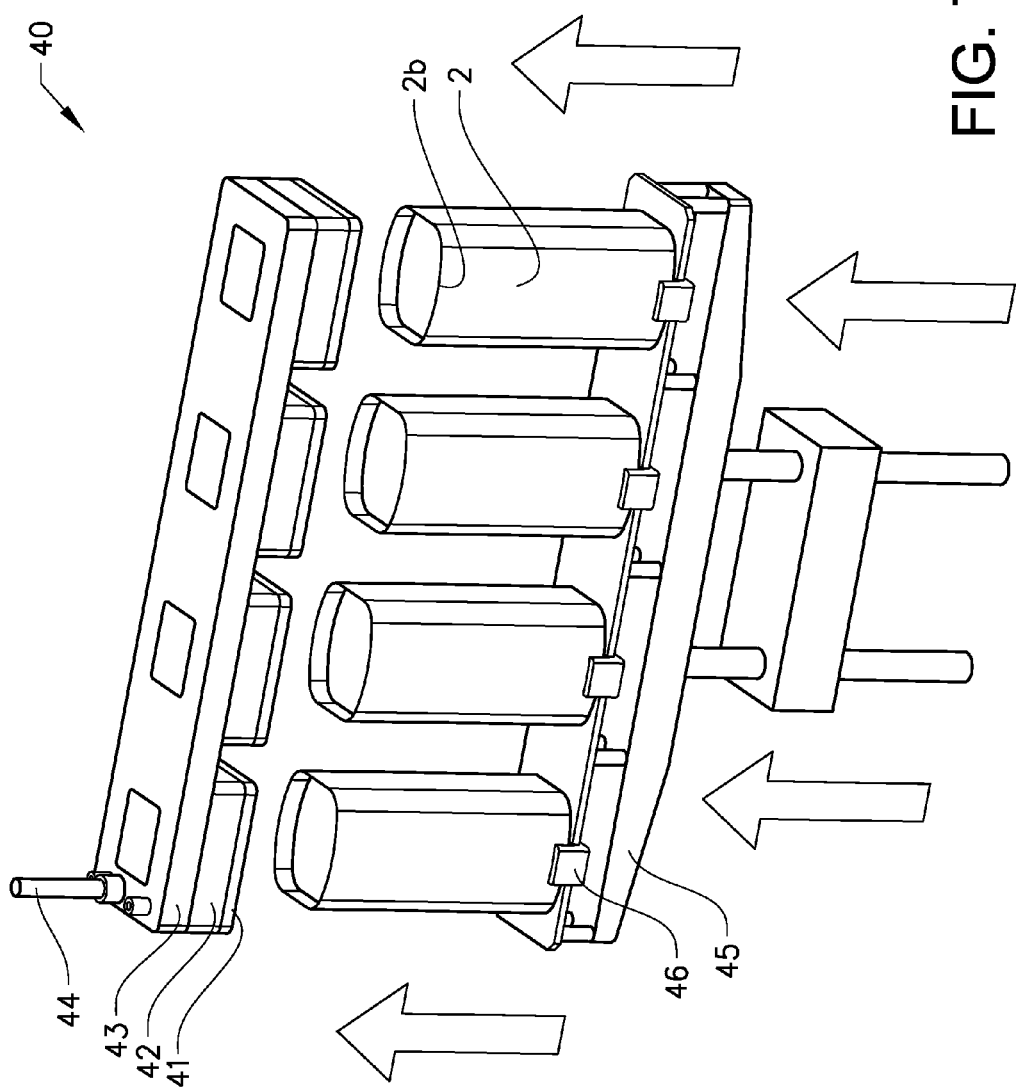
Figure 7B:
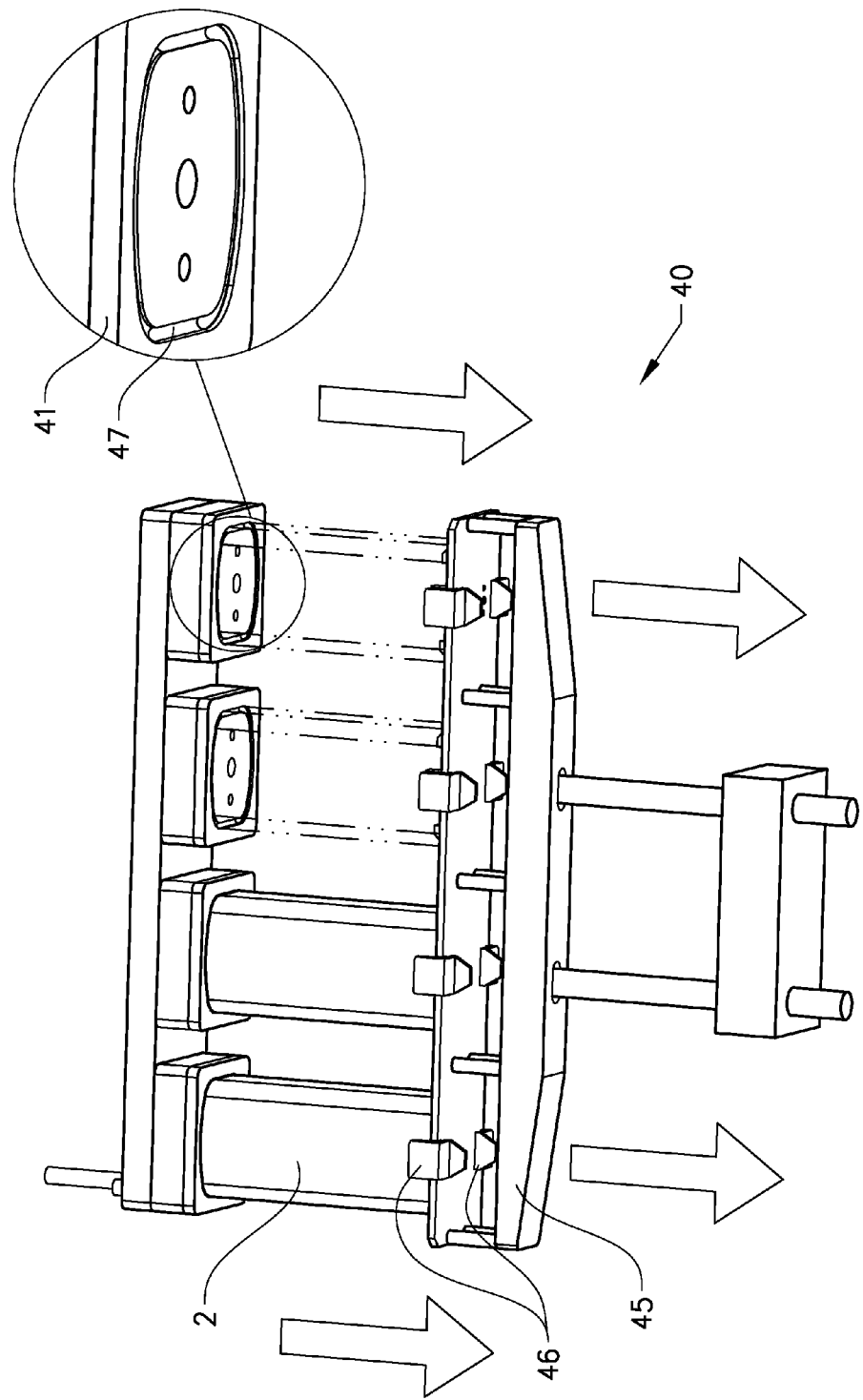
Figure 7C:
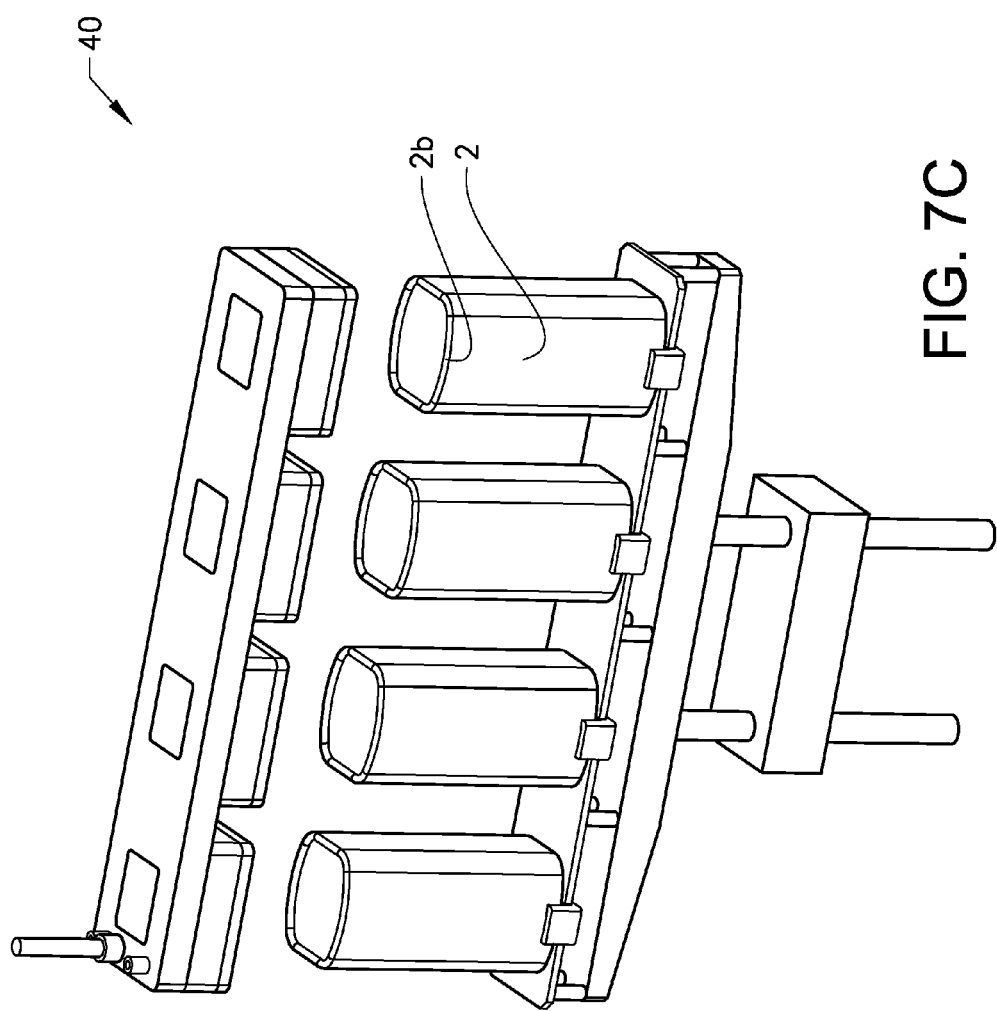

The second movable gripping arrangement 13 transfers the set of four container bodies to the container edge shaping unit (curling unit) 40. As shown in FIGS. 7A-7C the curling unit 40 comprises four subunits. Each subunit comprises a curling pad 41 provided with a curling groove 47 (see FIG. 7B) configured to receive and shape the container edge 2b. The curling pad 41 has a temperature of around 200° C. to provide a good effect. Each subunit further comprising a vertically adjustable container supporting and positioning device 45 configured to hold a container body 2 in place and press it towards the curling pad 41. Grippers 46 are provided for pulling the bodies 2 away from the pads 41. The curling pads 41 are mounted via a heat insulating material 42 to a water cooled beam 43 to avoid problems in the apparatus 1 related to thermal expansion. FIG. 7C shows container bodies 2 provided with end closures 17. Curling as such is well known to the person skilled in the art.

Figure 8A:
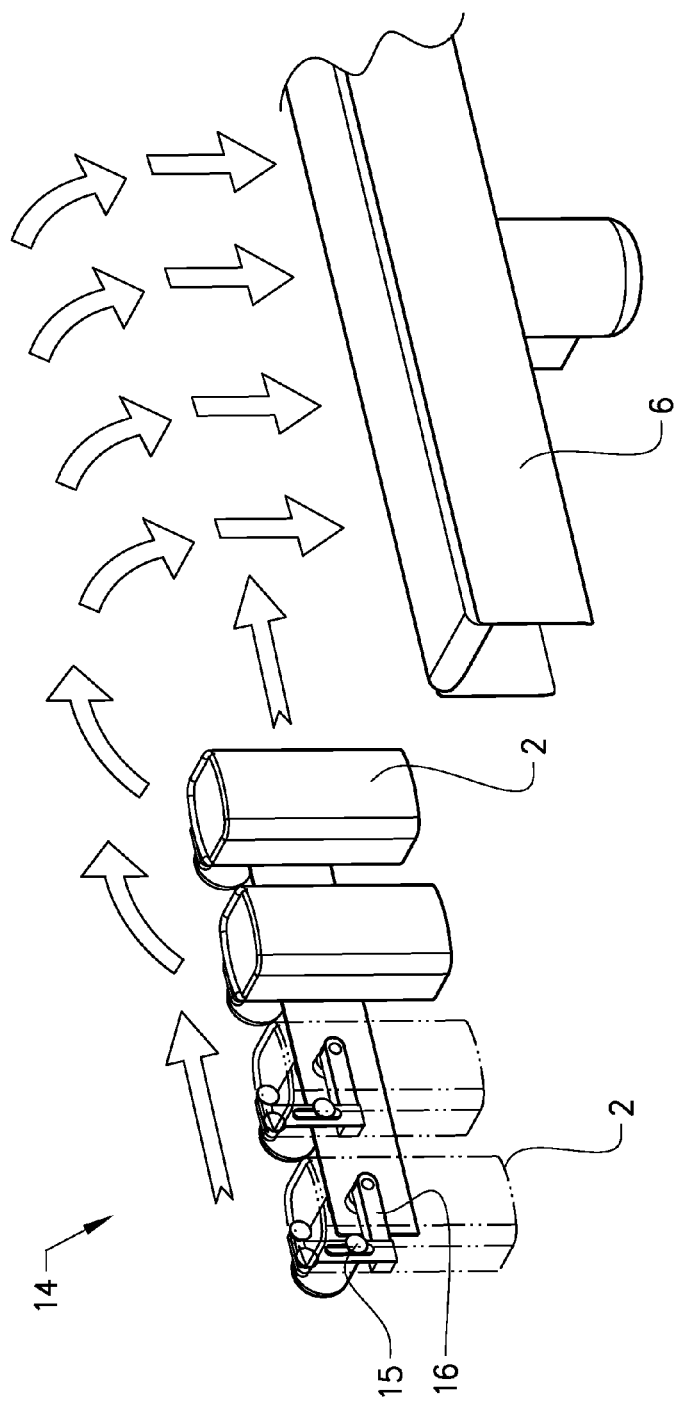
Figure 8B:
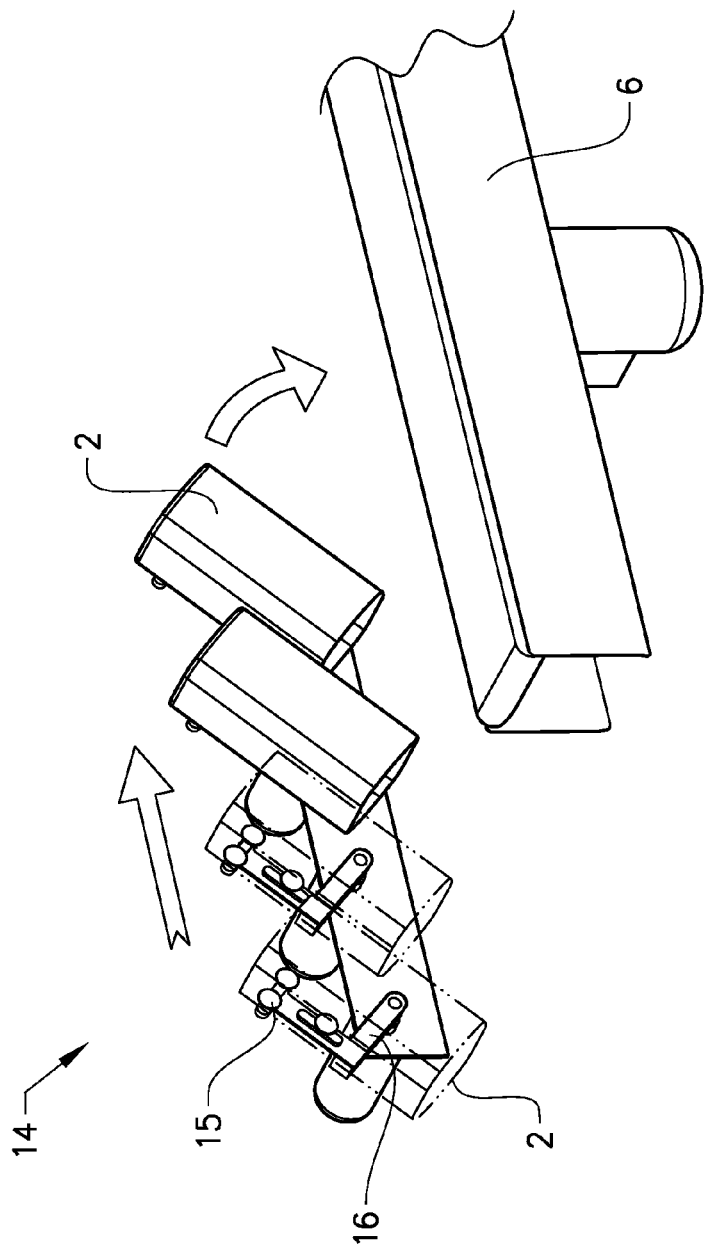
Figure 8C:
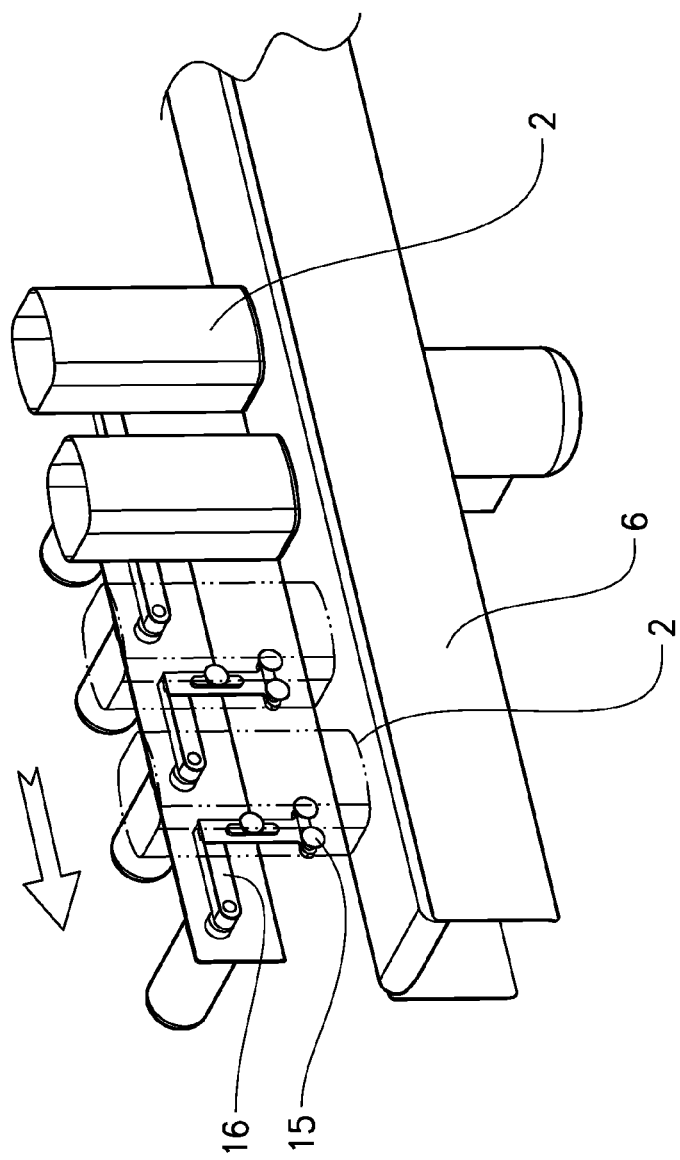

FIGS. 8A-8C show the third movable gripping arrangement 14 that transfers the container bodies 2 from the curling unit 40 to the outlet conveyor 6. Also the third movable gripping arrangement 14 is configured to grip four container bodies 2 and move these container bodies 2 simultaneously.

The third movable gripping arrangement 14 comprises four subunits and, each of these comprises a set of (in this example three) suction grippers 15 configured to grip a container body 2 on one of its outer sides. The set of suction grippers 15 is arranged on a rotationally suspended arm 16 capable of rotating the container body 180° during the transfer from the container edge shaping unit 40 to the outlet conveyor 6.

The moving parts of the apparatus, such as the movable gripping arrangements 11, 13, 14, are driven by servomotors (pilot motors) controlled by a control unit.

Typically, both the container body 2 and the end closure 17 form a multilayer structure comprising a supporting, outer cardboard layer and a weldable, inner layer with a layer of aluminium arranged in between for providing a sufficiently tight container/end closure and to allow inductive heating. However, the inductively heated layer can be the same layer as the weldable layer. For instance, the weldable can be an electrically conductive plastic layer.

The invention is not limited by the embodiments described above but can be modified in various ways within the scope of the claims. For instance, the number of simultaneously handled containers can be other than four.

The invention claimed is:

1. An apparatus for manufacturing of containers from blanks of a cardboard based material, said apparatus comprising:
   a container body forming unit configured to form a cylindrical container body from a substantially plane blank of a multilayer material comprising at least a supporting cardboard layer and a weldable layer;
   a welding unit configured to fasten an end closure to the container body, said welding unit comprising an inductive welding energy generator for melting of the weldable layer; and
   a transporter configured to transport a flow of body blanks to the container body forming unit, to transport a flow of container bodies from the container body forming unit to the welding unit, and to transport a flow of container bodies provided with end closures from the welding unit, wherein the transporter comprises:
   a first movable gripping arrangement configured to grip at least two container bodies and move these container bodies simultaneously to the welding unit; and
   a transferring and positioning arrangement configured to transfer container bodies from the container body forming unit to the first movable gripping arrangement and to position the container bodies in a controlled manner to ensure that the first movable gripping arrangement can grip the at least two container bodies properly,
   wherein the welding unit is configured to simultaneously fasten an end closure to each of the at least two container bodies.

2. The apparatus according to claim 1, wherein the transferring and positioning arrangement comprises a rotationally suspended supporting member provided with a ring-formed holding member adapted to receive and hold a container body, wherein the supporting member is configured to allow rotation from a first position, in which the ring-formed holding member is facing in a first direction towards the container body forming unit such as to receive a container body, to a second position, in which the ring-formed holding member is facing in a second direction forming substantially a right angle in relation to the direction of the first position, and
   wherein the transferring and positioning arrangement further comprises a lifting device that is movably adjustable in the second direction and configured to, when the supporting member is in its second position, lift or push out a container body placed in the ring-formed holding member in a direction from a rotational axis of the supporting member.

3. The apparatus according to claim 2, wherein the lifting device comprises a lifting or pushing part intended to contact the container body during lifting/pushing, wherein the ring formed holding member is provided with a slit adapted to allow a portion of the lifting part to pass through and thereby allow the lifting part to lift or push a container body all the way out of the ring formed holding member.

4. The apparatus according to claim 3, wherein the rotationally suspended supporting member is provided with a first and a second ring-formed holding member arranged in relation to each other onto the supporting member in such a way that when the first ring-formed holding member faces in the first direction the second ring-formed holding member faces in the second direction.

5. The apparatus according to claim 2, wherein the rotationally suspended supporting member is provided with a first and a second ring-formed holding member arranged in relation to each other onto the supporting member in such a way that when the first ring-formed holding member faces in the first direction the second ring-formed holding member faces in the second direction.

6. The apparatus according to claim 5, wherein the rotationally suspended supporting member is provided with four ring-formed holding members evenly distributed in a circumferential manner of the rotationally suspended supporting member.

7. The apparatus according to claim 6, wherein the transferring and positioning arrangement comprises first and second movable guiding members configured to guide the container body when pushed out from the ring-formed holding member via the lifting device, said first and second movable guiding members being moveable towards and away from each other between a first and a second position, wherein, in the first position, a space is formed between the guiding members which space is adapted to receive the container body when exiting the ring-formed holding member and to hold the container body in a certain position until the first movable gripping arrangement has gripped the container body, and wherein, in the second position, the guiding members are separated from each other so that the container body can be moved away by the first movable gripping arrangement.

8. The apparatus according to claim 2, wherein the transferring and positioning arrangement comprises first and second movable guiding members configured to guide the container body when pushed out from the ring-formed holding member via the lifting device, said first and second movable guiding members being moveable towards and away from each other between a first and a second position, wherein, in the first position, a space is formed between the guiding members which space is adapted to receive the container body when exiting the ring-formed holding member and to hold the container body in a certain position until the first movable gripping arrangement has gripped the container body, and wherein, in the second position, the guiding members are separated from each other so that the container body can be moved away by the first movable gripping arrangement.

9. The apparatus according to claim 2, wherein the welding unit comprises at least two subunits, each subunit comprising a cavity adapted to receive at least an end part of the container body where the end closure is to be fastened, wherein the inductive welding energy generator, such as a coil, extends around the cavity such as to circumferentially surround a container body placed in the cavity along a distance corresponding to a side edge of an end closure placed in its intended fastening position in the container, each subunit further comprising an end closure positioning device configured to position an end closure in the intended fastening position.

10. The apparatus according to claim 2, wherein the first moveable gripping arrangement comprises a first and a second gripping element arranged to operate on opposite sides of the flow of container bodies, wherein the gripping elements are moveable towards and away from each other for gripping and releasing the container bodies, respectively, and wherein the gripping elements, in a synchronized manner, are movable along the flow of container bodies between the transferring and positioning arrangement and the welding unit for the simultaneous transfer of container bodies, each gripping element being provided with at least two recesses for gripping on each side of a corresponding number of simultaneously gripped container bodies.

11. The apparatus according to claim 2, wherein the apparatus further comprises a container edge shaping unit arranged downstream of the welding unit, wherein the edge shaping unit comprises at least two subunits, each subunit comprising a curling pad provided with a curling groove configured to receive and shape the container edge, each subunit further comprising an adjustable container supporting and positioning device configured to hold a container body in place and press it towards the curling pad.

12. The apparatus according to claim 1, wherein the welding unit comprises at least two subunits, each subunit comprising a cavity adapted to receive at least an end part of the container body where the end closure is to be fastened, wherein the inductive welding energy generator, such as a coil, extends around the cavity such as to circumferentially surround a container body placed in the cavity along a distance corresponding to a side edge of an end closure placed in its intended fastening position in the container, each subunit further comprising an end closure positioning device configured to position an end closure in the intended fastening position.

13. The apparatus according to claim 1, wherein the first moveable gripping arrangement comprises a first and a second gripping element arranged to operate on opposite sides of the flow of container bodies, wherein the gripping elements are moveable towards and away from each other for gripping and releasing the container bodies, respectively, and wherein the gripping elements, in a synchronized manner, are movable along the flow of container bodies between the transferring and positioning arrangement and the welding unit for the simultaneous transfer of container bodies, each gripping element being provided with at least two recesses for gripping on each side of a corresponding number of simultaneously gripped container bodies.

14. The apparatus according to claim 13, wherein the second movable gripping arrangement comprises a first and a second gripping element arranged to operate on opposite sides of the flow of container bodies, wherein the gripping elements of the second movable gripping arrangement are moveable towards and away from each other for gripping and releasing the container bodies, respectively, and wherein the gripping elements of the second movable gripping arrangement, in a synchronized manner, are movable along the flow of container bodies between the transferring and positioning arrangement and the welding unit for the simultaneous transfer of container bodies, each gripping element being provided with at least two recesses for gripping on each side of a corresponding number of simultaneously gripped container bodies.

15. The apparatus according to claim 1, wherein the apparatus further comprises a container edge shaping unit arranged downstream of the welding unit, wherein the edge shaping unit comprises at least two subunits, each subunit comprising a curling pad provided with a curling groove configured to receive and shape the container edge, each subunit further comprising an adjustable container supporting and positioning device configured to hold a container body in place and press it towards the curling pad.

16. The apparatus according to claim 15, wherein the curling pad is mounted on a water cooled beam.

17. The apparatus according to claim 15, wherein the transporter comprises a second movable gripping arrangement configured to grip at least two container bodies and move these container bodies simultaneously from the welding unit to the container edge shaping unit.

18. The apparatus according to claim 15, wherein the transporter comprises a third movable gripping arrangement configured to grip at least two container bodies and move these container bodies simultaneously from the container edge shaping unit to an outlet conveyor.

19. The apparatus according to claim 18, wherein the third movable gripping arrangement comprises at least two subunits, each subunit comprising a set of suction gripper configured to grip a container body on one of its sides, said set of suction grippers being arranged on a rotationally suspended arm capable of rotating the container body 180° during the transfer from the container edge shaping unit to the outlet conveyor.

* * * * *